(12) United States Patent
Hamada et al.

(10) Patent No.: US 7,821,881 B2
(45) Date of Patent: Oct. 26, 2010

(54) REPRODUCTION DEVICE, REPRODUCTION METHOD, REPRODUCTION PROGRAM, AND RECORDING MEDIUM

(75) Inventors: Toshiya Hamada, Saitama (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1252 days.

(21) Appl. No.: 10/543,372

(22) PCT Filed: Aug. 19, 2004

(86) PCT No.: PCT/JP2004/012243

§ 371 (c)(1),
(2), (4) Date: Jul. 26, 2005

(87) PCT Pub. No.: WO2005/052940

PCT Pub. Date: Sep. 6, 2005

(65) Prior Publication Data

US 2006/0140079 A1    Jun. 29, 2006

(30) Foreign Application Priority Data

Nov. 28, 2003 (JP) .............................. 2003-399546

(51) Int. Cl.
*G11B 7/085* (2006.01)
(52) U.S. Cl. .................................................. 369/30.03
(58) Field of Classification Search ........................ None
See application file for complete search history.

(56) References Cited

U.S. PATENT DOCUMENTS 6,144,375 A * 11/2000 Jain et al. .................... 715/251
7,392,481 B2 * 6/2008 Gewickey et al. ........... 715/716
2001/0021995 A1 * 9/2001 Hatano ........................ 725/50
2002/0069360 A1    6/2002 Thoone et al.
2002/0146239 A1 * 10/2002 Hamasaka et al. ........... 386/95
2002/0194618 A1    12/2002 Okada et al.
2003/0028892 A1    2/2003 Gewickey et al.
2003/0161615 A1    8/2003 Tsumagari et al.
2005/0105888 A1 * 5/2005 Hamada et al. ............... 386/95

FOREIGN PATENT DOCUMENTS

| EP | 1 328 114 A1 | 7/2003 |
| EP | 1 603 335 A1 | 12/2005 |
| JP | 2000-57746 | 2/2000 |
| JP | 2002-369154 | 12/2002 |
| JP | 2003-249057 | 9/2003 |
| JP | 2003-303248 | 10/2003 |
| WO | WO 2004/049710 A1 | 6/2004 |

* cited by examiner

*Primary Examiner*—Joseph H Feild
*Assistant Examiner*—Henok G Heyi
(74) *Attorney, Agent, or Firm*—Oblon, Spivak, McClelland, Maier & Neustadt, L.L.P.

(57) ABSTRACT

With a reproduction-only disc having a large recording capacity, an interactive function having a higher degree of freedom than the related art can be easily accomplished. A virtual player model corresponding to a function of a player is created and described in Java. BDBasicPlayer 210 detects a user input and the status change of the player and generates an event. An object 211 that implements a listener interface registers an event listener corresponding to an event that the object 211 is caused to receive to BDBasicPlayer 210 before the event takes place. When the event becomes unnecessary, it is unregistered. BDBasicPlayer 210 transmits the event to the object 211 in which the event listener has been registered. The object 211 executes a method corresponding to the received event. The relationships between events and methods can be flexibly set. Thus, a complicated interactive function can be easily accomplished.

25 Claims, 47 Drawing Sheets

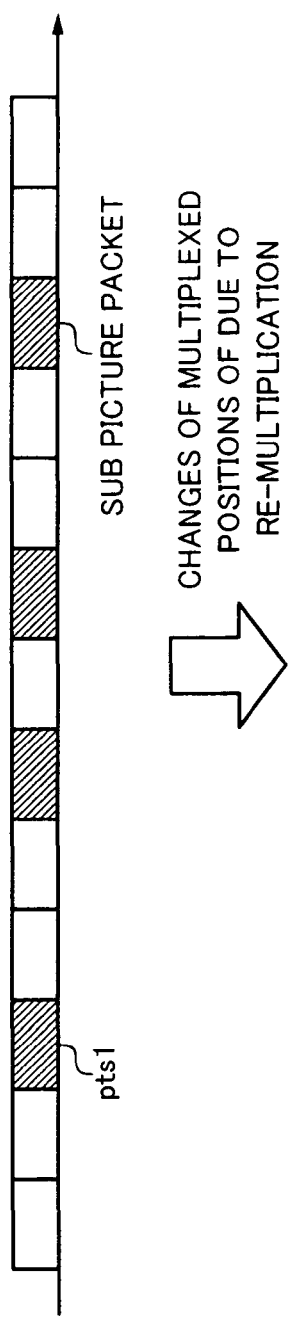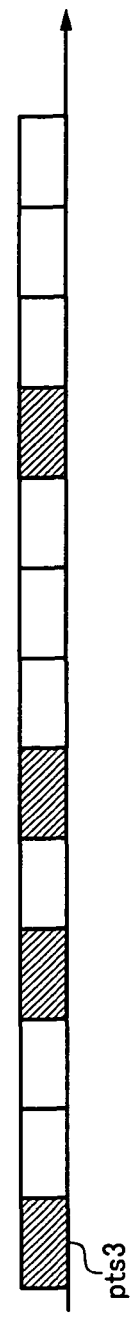

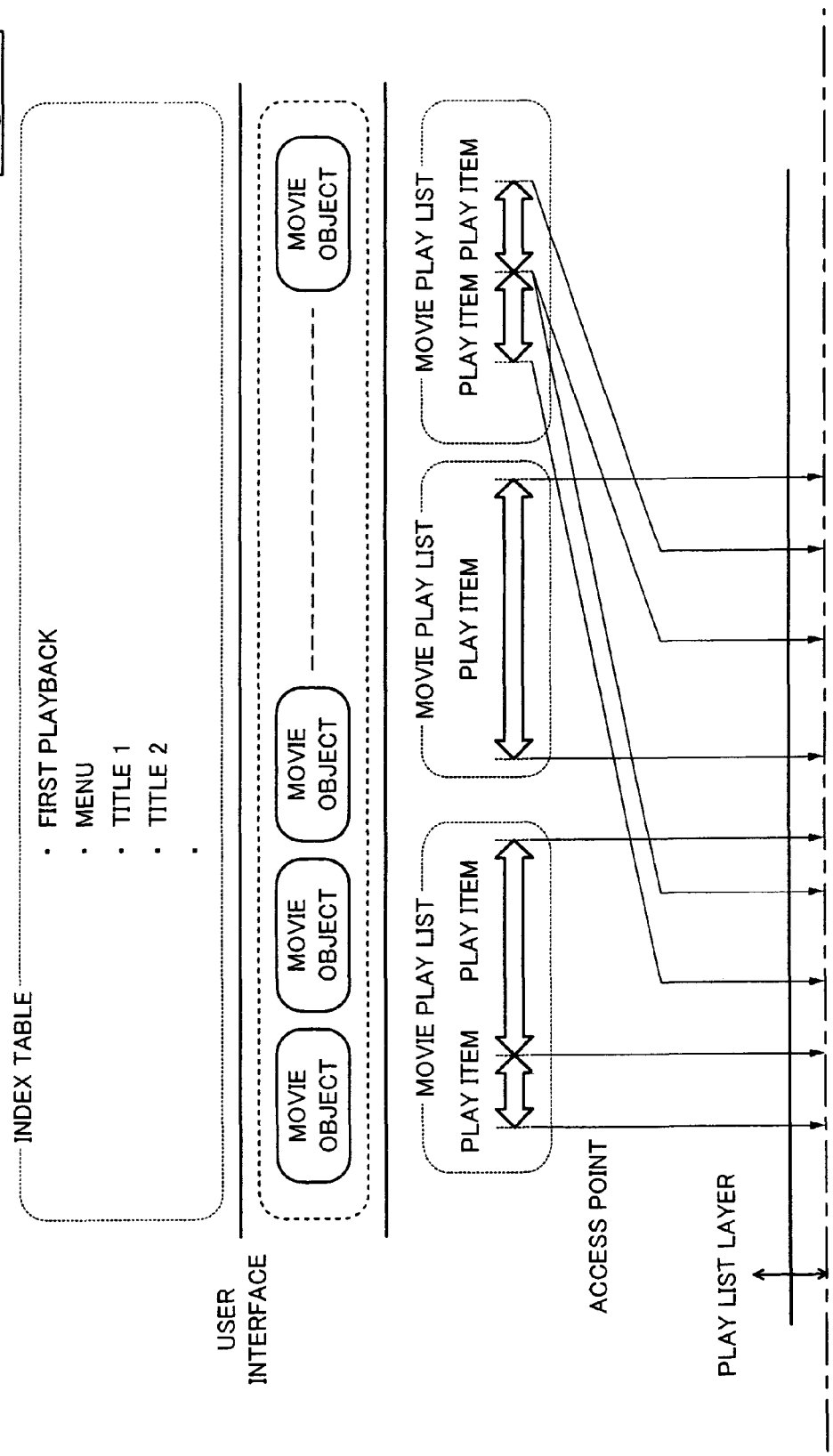

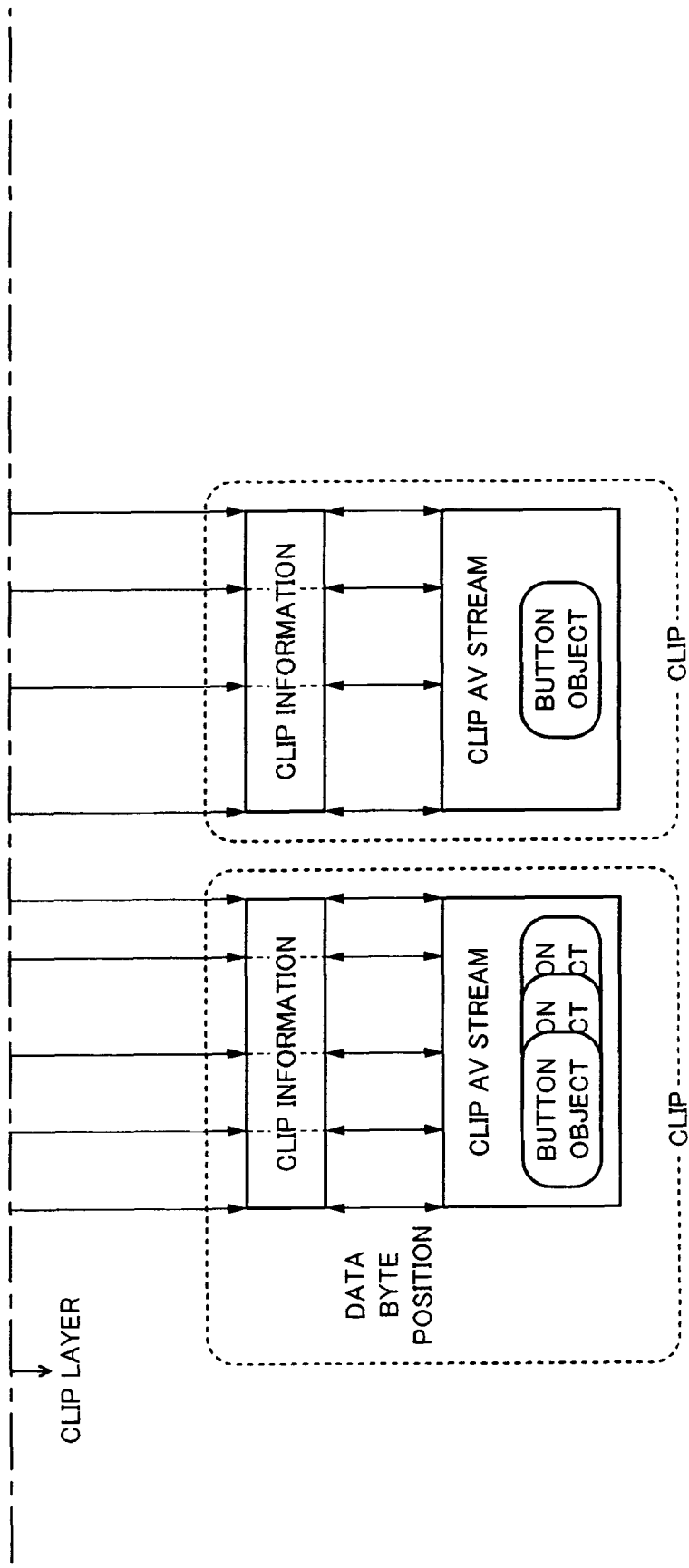

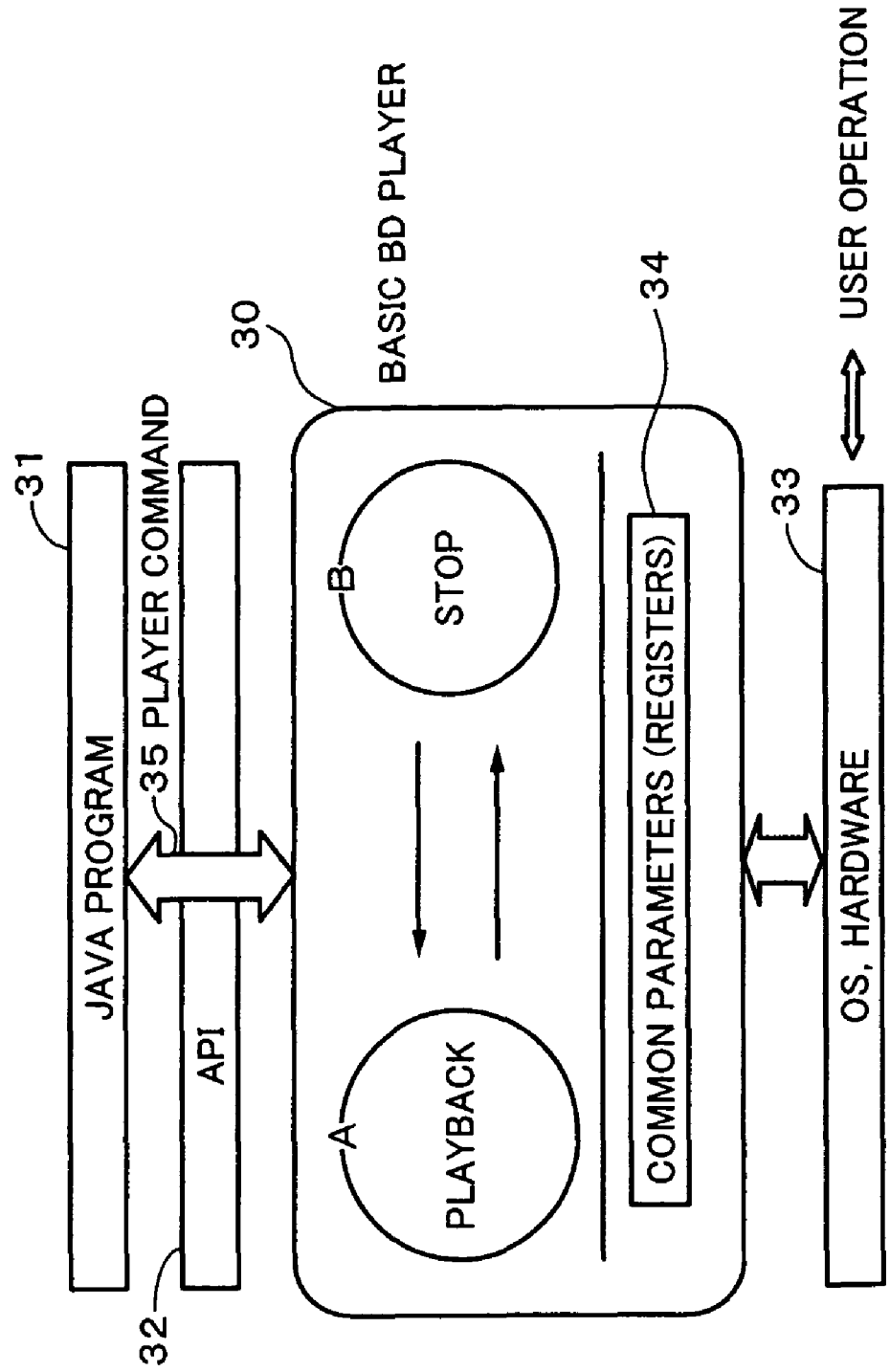

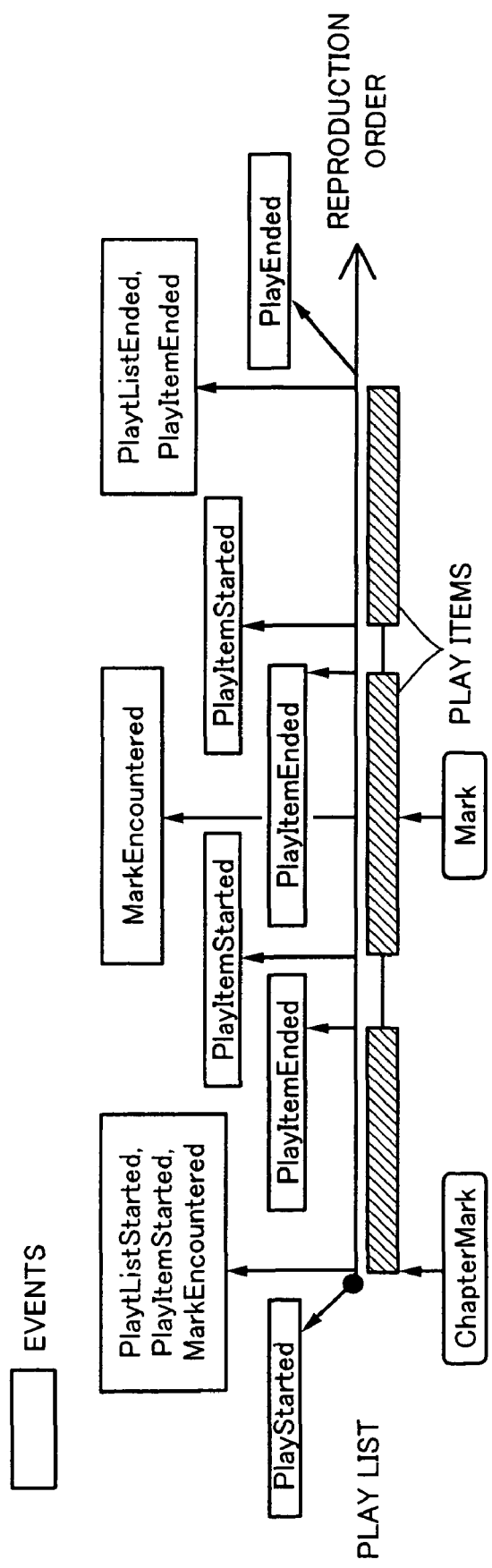

Fig. 7

| METHODS USED TO OBTAIN PLAYER SET INFORMATION | |
|---|---|
| getPlayerSpeed() | OBTAINS REPRODUCTION SPEED. |
| getPlayerDirection() | OBTAINS REPRODUCTION DIRECTION. |
| getDescriptionLanguage() | OBTAINS DISPLAY LANGUAGE OF PLAYER. |
| getPlayListNumber() | OBTAINS PLAY LIST NUMBER CURRENTLY BEING REPRODUCED. |
| getChapterNumber() | OBTAINS CHAPTER NUMBER CURRENTLY BEING REPRODUCED. |
| getPlayerSupport() | OBTAINS VERSION AND FUNCTIONS OF PLAYER. |

| METHODS USED TO REPRODUCE PLAY LISTS | |
|---|---|
| playPlayList(int playListNumber, long [playListTime]) | STARTS REPRODUCTION OF PLAY LIST DESIGNATED BY playListNumber.<br>playListTime IS NOT ESSENTIAL.<br>playListTime DESIGNATES ELAPSED TIME IN PLAY LIST.<br>STARTS REPRODUCTION FROM playListTime. |
| playPlayList(String playListURL, long [playListTime]) | STARTS REPRODUCTION OF PLAY LIST DESIGNATED BY playListURL.<br>playListTime IS NOT ESSENTIAL.<br>playListTime DESIGNATES ELAPSEDTIME IN PLAY LIST.<br>STARTS REPRODUCTION OF PLAY LIST FROM playListTime. |

Fig. 8B

| | |
|---|---|
| playPlayItem(int playListNumber, int playItemNumber) | STARTS REPRODUCTION OF DESIGNATED PLAY LIST FROM DESIGNATED PLAY ITEM.<br>playItemNumber IS PlayItem_id STARTING FROM 0.<br>WHEN REPRODUCTION IS STARTED FROM BEGINNING OF PLAY LIST, playItemNumber IS 0. |
| playPlayItem(String playListURL, int playItemNumber) | STARTS REPRODUCTION OF DESIGNATED PLAY LIST FROM DESIGNATED PLAY ITEM.<br>playItemNumber IS PlayItem_id STARTING FROM 0.<br>WHEN REPRODUCTION IS STARTED FROM BEGINNING OF PLAY LIST, playItemNumber IS 0. |
| playChapterMark<br>(int playListNumber, int chapterNumber) | REPRODUCES PLAY LIST DESIGNATED BY playListNumber FROM CHAPTER DESIGNATED BY chapterNumber.<br>playListNumber MAY BE playListURL.<br>PLAY LIST ALWAYS STARTS WITH CHAPTER MARK. |

Fig. 8C

| | |
|---|---|
| moveAndPlay(string position, object)<br><br>position = ("prev" \| "next" \| "top" \| "tail")<br><br>object = ("PlayItem" \| "Chapter") | DESIGNATES JUMP IN PLAY LIST.<br>next DESIGNATES JUMP FROM CURRENTLY REPRODUCED POSITION TO NEXT PLAY ITEM OR CHAPTER AND STARTS REPRODUCTION THEREOF.<br>top DESIGNATES JUMP TO BEGINNING OF PLAY LIST.<br>tail DESIGNATES JUMP TO END OF PLAY LIST.<br>prev STARTS REPRODUCTION FROM BEGINNING OF CURRENTLY REPRODUCED PLAY ITEM. |
| stop() | STOPS REPRODUCTION.<br>VALUE OF STANDARD REGISTER IS NOT KEPT. |
| playSoundEffect(int sound_id) | REPRODUCES SELECTED SOUND EFFECT. |

Fig. 9

| METHODS USED FOR VIDEO STREAMS | |
|---|---|
| getVideoStreamAvailability() | OBTAINS STATUS REPRESENTING WHETHER OR NOT DESIGNATED VIDEO STREAM IS CONTAINED. |
| setVideoStreamNumber() | DESIGNATES VIDEO STREAM TO BE DECODED. |
| getVideoStreamNumber() | OBTAINS VIDEO STREAM NUMBER THAT HAS BEEN SELECTED. |
| getVideoStreamAttribute() | OBTAINS ATTRIBUTES OF VIDEO STREAM (ENCODING SYSTEM, RESOLUTION, ASPECT RATIO, DISPLAY MODE IN CASE OF ASPECT RATIO OF 4 : 3, AND CLOSED CAPTION). |
| setAngleNumber() | DESIGNATES ANGLE NUMBER. |
| getAngleNumber() | OBTAINS ANGLE NUMBER THAT HAS BEEN SELECTED. |
| getMaxVideoStreams() | OBTAINS NUMBER OF VIDEO STREAMS THAT CAN BE SELECTED. |

Fig. 10

| METHODS USED FOR AUDIO STREAMS | |
|---|---|
| getAudioStreamAvailability() | OBTAINS STATUS REPRESENTING WHETHER OR NOT DESIGNATED STREAM IS CONTAINED. |
| getAudioStreamLanguage() | OBTAINS INFORMATION ABOUT LANGUAGE USED IN DESIGNATED AUDIO STREAM. |
| setAudioStreamNumber() | DESIGNATES AUDIO STREAM TO BE REPRODUCED. |
| getAudioStreamNumber() | OBTAINS AUDIO STREAM NUMBER BEING REPRODUCED. |
| getAudioStreamAttribute() | OBTAINS ATTRIBUTES OF AUDIO STREAM (ENCODING SYSTEM, NUMBER OF chS, Q, AND fs). |
| getMaxAudioStreams() | OBTAINS NUMBER OF AUDIO STREAMS THAT CAN BE SELECTED. |

*Fig. 11*

| METHODS USED FOR SUB PICTURE (SP) STREAMS | |
|---|---|
| getSPStreamAvailability() | OBTAINS STATUS REPRESENTING WHETHER OR NOT DESIGNATED SP STREAM IS CONTAINED. |
| getSPStreamLanguage() | OBTAINS LANGUAGE USED IN DESIGNATED SP STREAM. |
| getSPDisplayStatus() | OBTAINS DISPLAY STATUS OF SP (DISPLAYED OR NOT DISPLAYED). |
| setSPDisplayStatus() | SETS DISPLAY STATUS OF SP (TO BE DISPLAYED OR NOT DISPLAYED). |
| getSPStreamAttribute() | OBTAINS ATTRIBUTES OF SP. ATTRIBUTES OF SP ARE FOR EXAMPLE INFORMATION ABOUT RESOLUTIONS, ASPECT RATIO OF 4 : 3 TYPE, WIDE TYPE, ETC. |

Fig. 12

| METHODS USED FOR INTERNAL TIMERS | |
|---|---|
| sleep() | STOP PROCESS FOR DESIGNATED MILLISECONDS. |
| setTimeout() | EXECUTES FUNCTION OR PROCESS AFTER DESIGNATED MILLISECONDS ELAPSE. |
| setInterval() | EXECUTES PROCESS AT INTERVALS OF DESIGNATED MILLISECONDS. |
| clearTimer() | STOPS PROCESS OF TIMER HAVING DESIGNATED REGISTERED TIMER ID. |
| pauseTimer() | PAUSES TIMER HAVING DESIGNATED REGISTERED TIMER ID. |
| resumeTimer() | RESUMES PAUSED TIMER HAVING DESIGNATED REGISTERED TIMER ID. |

Fig. 14A

| Fig. 14 |
|---|
| Fig. 14A |
| Fig. 14B |
| Fig. 14C |

| EVENT NAME | DESCRIPTION |
|---|---|
| EVENTS THAT TAKE PLACE IN CONTENT BEING REPRODUCED | |
| MarkEncounteredEvent | MARK WAS DETECTED WHILE CONTENT WAS BEING REPRODUCED. THIS EVENT IS USED WHEN GRAPHICS SCREEN IS DISPLAYED. |
| ValidPeriodStartedEvent | SELECTION VALID PERIOD OF USER INPUT STARTED. |
| ValidPeriodEndedEvent | VALID PERIOD OF USER INPUT ENDED. THIS EVENT IS USED WHEN LINK IS FORCEDLY EXECUTED. |

Fig. 14B

| | |
|---|---|
| PlayRepeatedEvent | BEGINNING OF REPEAT REPRODUCTION REGION WAS DETECTED. |
| VideoStreamChangedEvent | VIDEO STREAM THAT WAS BEING REPRODUCED WAS CHANGED. |
| AudioStreamChangedEvent | AUDIO STREAM THAT WAS BEING REPRODUCED WAS CHANGED. |
| SubpictureStreamChangedEvent | SUB PICTURE STREAM THAT WAS BEING REPRODUCED WAS CHANGED. |
| StreamDisplayStatusChangedEvent | DISPLAY/NON-DISPLAY STATUS OF STREAM WAS CHANGED. |
| PlayListStartedEvent | BEGINNING OF PLAY LIST WAS DETECTED. |
| PlayListEndedEvent | END OF PLAY LIST WAS DETECTED. |
| PlayItemStartedEvent | BEGINNING OF PLAY ITEM WAS DETECTED. |
| PlayItemEndedEvent | END OF PLAY ITEM WAS DETECTED. |

Fig. 14C

| | | |
|---|---|---|
| EVENT THAT TAKES PLACE CORRESPONDING TO KEY INPUT | | |
| | RmKeyEvent | KEY OF REMOTE CONTROLLER WAS PRESSED. KEY THAT WAS PRESSED IS DETERMINED IN CORRESPONDING EVENT LISTENER. |
| EVENTS THAT TAKE PLACE CORRESPONDING TO STATUS CHANGES OF PLAYER | | |
| | PlayStartedEvent | REPRODUCTION WAS STARTED. |
| | PlayStoppedEvent | REPRODUCTION WAS STOPPED. |
| | PlayStilledEvent | REPRODUCTION WAS STILLED. |
| | StillReleasedEvent | STILLED STATUS WAS RELEASED. |
| | PlayPausedEvent | REPRODUCTION WAS PAUSED BY USER. |
| | PauseReleasedEvent | PAUSED STATUS WAS RELEASED. |
| | TimerFiredEvent | COUNT DOWN TIMER BECAME 0. COUNT UP TIMER BECAME PREDETERMINED VALUE. |

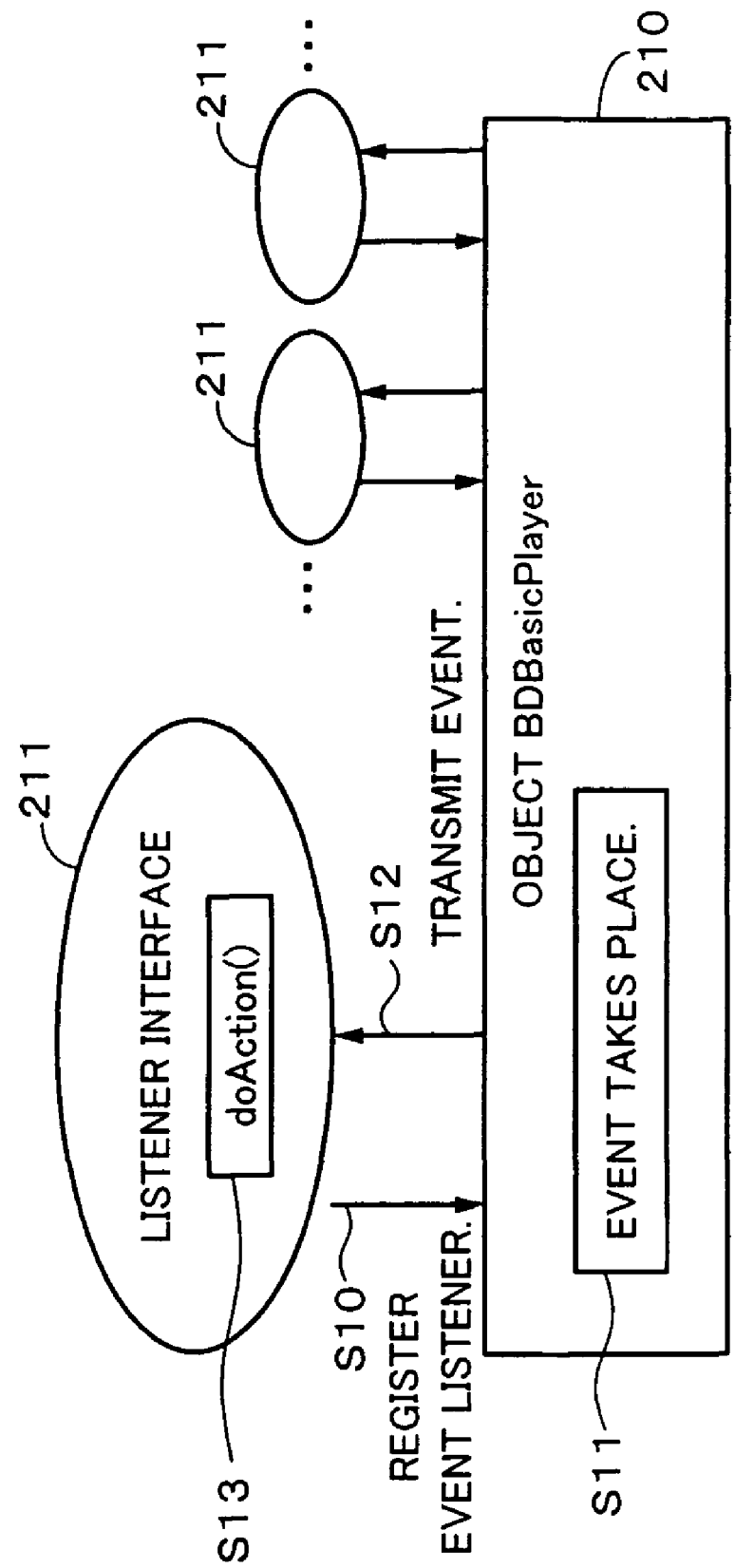

Fig. 16A

| Fig. 16 |
|---|
| Fig. 16A |
| Fig. 16B |

| METHODS USED TO REGISTER LISTENERS | |
|---|---|
| addContentsListener(ContentsListener l) | REGISTERS DESIGNATED LISTENER TO BDBasicPlayer TO RECEIVE ContentsEvent FROM BDBasicPlayer. |
| addRmtKeyListener(RmtKeyListener l) | REGISTERS DESIGNATED LISTENER TO RECEIVE RmtKeyEvent FROM BDBasicPlayer. |
| addPlayerStatusListener (PlayerStatusListener l) | REGISTER DESIGNATED LISTENER TO RECEIVE PlayerStatusEvent FROM BDBasicPlayer. |

Fig. 16B

| | |
|---|---|
| removeContentsListener(ContentsListener l) | REMOVE DESIGNATED LISTENER NOT TO RECEIVE ContentsEvent FROM BDBasicPlayer. |
| removeRmtKeyListener(RmtKeyListener l) | REMOVE DESIGNATED LISTENER NOT TO RECEIVE RMTKEYEVENT FROM BDBasicPlayer. |
| removePlayerStatusListener (PlayerStatusListener l) | REMOTE DESIGNATED LISTENER NOT TO RECEIVE PlyerStatusVvent FROM BDBasicPlayer. |
| getContentsListeners() | RETURNS ARRAY OF ALL CountsListeners REGISTERED IN BDBasicPlayer. |
| getRmtkeyListeners() | RETURNS ARRAY OF ALL RmtkeyListeners REGISTERED IN BDBasicPlayer. |
| getPlayerStatusListeners() | RETURNS ARRAY OF ALL PlayerStausListeners REGISTERED IN BDBasicPlayer. |

| USER INPUT COMMANDS | DESCRIPTION |
|---|---|
| timeSearch(playlistNumber, Time) | CAUSES SCENARIO BEING REPRODUCED TO BE REPRODUCED FROM DESIGNATED TIME. |
| play(playlistNumber, chapterNumber) | CAUSES DESIGNATED SCENARIO TO BE REPRODUCED FROM DESIGNATED CHAPTER. |
| stop() | CAUSES REPRODUCTION TO BE STOPPED. |
| prev() | CAUSES REPRODUCTION TO BE STARTED FROM BEGINNING OF PREVIOUS CHAPTER. |
| top() | CAUSES REPRODUCTION TO BE STARTED FROM BEGINNING OF CURRENT CHAPTER. |

Fig. 21B

| | |
|---|---|
| next() | CAUSES REPRODUCTION TO BE STARTED FROM BEGINNING OF NEXT CHAPTER. |
| forwardScan(speed) | CAUSES REPRODUCTION TO BE PERFORMED IN FORWARD DIRECTION AT SPEED DESIGNATED BY speed. speed RANGING FROM 0.1 TO 360. |
| backwardScan(speed) | CAUSES REPRODUCTION TO BE PERFORMED IN REVERSE DIRECTION AT SPEED DESIGNATED BY speed. |
| moveCursor(direction, [level]) direction=("upper" \| "lower" \| "left" \| "right") level="0"~"255" | CAUSES CURSOR TO BE MOVED IN UPPER, LOWER, LEFT, AND RIGHT DIRECTIONS. level IS OPTIONAL. NORMALLY level IS NOT USED OR 0. WITH INTERMEDIATE VALUE (1 TO 255), ANALOG JOY STICK OR THE LIKE CAN BE REPRESENTED. |
| click(buttonNumber) | CAUSES BUTTON ON SCREEN TO BE CLICKED. |

Fig. 21C

| | |
|---|---|
| focus(buttonNumber) | CAUSES BUTTON ON SCREEN TO BE FOCUSED. |
| stillOff() | CAUSES REPRODUCTION STILLED BY PLAYER TO BE RESUMED. INTEGRATED WITH pauseOff. |
| pauseOn() | PAUSE. OPERATED ONLY WHEN SCENARIO IS REPRODUCED. |
| pauseOff() | CAUSES PAUSED REPRODUCTION TO BE RELEASED. |
| LanguageSelect(languageCode) | DESIGNATES DISPLAY LANGUAGE OF MENU. |

Fig. 21D

| | |
|---|---|
| StreamChange(StreamNumber) | CAUSES STEAM BEING REPRODUCED TO BE CHANGED. |
| setEnabled(boolean) | CAUSES STREAM TO BE DISPLAYED/NOT DISPLAYED. |
| angleChange(angleNumber) | CAUSES DISPLAY ANGLE TO BE CHANGED. |
| parentalCountrySelect(countryCode) | CAUSES COUNTRY CODE OF PARENTAL LEVEL TO BE SET. |
| videoPresentationModeChange(mode) | mode=(Wide \| LB \| PanScan) |

Fig. 22

RmtKeyEvent CLASS

| public RmtKeyEvent(Object source, int id, long when, int rmtKeyCode) | |
|---|---|
| source | OBJECT OF SOURCE OF EVENT. REPRESENTS BDBasicPlayer. |
| id | INTEGER REPRESENTING TYPE OF EVENT |
| when | LONG TYPE INTEGER DESIGNATING TIME AT WHICH EVENT TAKES PLACE |
| rmtKeyCode | INTEGER TYPE CODE CORRESPONDING TO INPUT VIRTUAL KEY OR VK_UNDEFINED |

Fig. 23

| OUTLINE OF METHODS | | |
|---|---|---|
| getRmtKeyCode | RETURNS KEY CODE CORRESPONDING TO KEY THAT CAUSED EVENT TO TAKE PLACE. | public void |
| setRmtKeyCode | SETS KEY CODE CORRESPONDING TO KEY THAT CAUSES EVENT TO TAKE PLACE. | public void |

Fig. 24

| OUTLINE OF FIELDS | | |
|---|---|---|
| VK_POWER | POWER KEY | public static final int |
| VK_POWER_ON | POWER ON KEY | public static final int |
| VK_POWER_OFF | POWER OFF KEY | public static final int |
| VK_MENU | MENU KEY | public static final int |
| VK_ENTER | ENTER | public static final int |
| VK_RETURN | RETURN | public static final int |
| VK_PLAY | PLAY | public static final int |
| VK_STOP | STOP | public static final int |
| VK_PAUSE | PAUSE | public static final int |
| VK_FAST_FORWARD | FAST FORWARD | public static final int |
| VK_FAST_REVERSE | FAST REVERSE | public static final int |
| VK_SLOW_FORWARD | SLOW (FORWARD) | public static final int |
| VK_SLOW_REVERSE | SLOW (REVERSE) | public static final int |
| VK_STEP_FORWARD | STEP (FORWARD) | public static final int |
| VK_STEP_REVERSE | STEP (REVERSE) | public static final int |

Fig. 25

| Fig. 25A |
|---|
| Fig. 25B |

Fig. 25A

| OUTLINE OF FIELDS | | |
|---|---|---|
| VK_NEXT | NEXT | public static final int |
| VK_PREVIOUS | PREVIOUS | public static final int |
| VK_UP | UP | public static final int |
| VK_DOWN | DOWN | public static final int |
| VK_RIGHT | RIGHT | public static final int |
| VK_LEFT | LEFT | public static final int |
| VK_UP_RIGHT | UPPER RIGHT | public static final int |
| VK_UP_LEFT | UPPER LEFT | public static final int |
| VK_DOWN_RIGHT | LOWER RIGHT | public static final int |
| VK_DOWN_LEFT | LOWER LEFT | public static final int |

Fig. 25B

| | | |
|---|---|---|
| VK_ANGLE | ANGLE SELECTION | public static final int |
| VK_PRESENTATION_GRAPHICS | SUB TITLE SELECTION | public static final int |
| VK_AUDIO | AUDIO SELECTION | public static final int |
| VK_VIDEO_ASPECT | VIDEO ASPECT RATIO SELECTION | public static final int |
| VK_COLORED_KEY_1 | COLORED FUNCTION KEY 1 | public static final int |
| VK_COLORED_KEY_2 | COLORED FUNCTION KEY 2 | public static final int |
| VK_COLORED_KEY_3 | COLORED FUNCTION KEY 3 | public static final int |
| VK_COLORED_KEY_4 | COLORED FUNCTION KEY 4 | public static final int |
| VK_COLORED_KEY_5 | COLORED FUNCTION KEY 5 | public static final int |
| VK_COLORED_KEY_6 | COLORED FUNCTION KEY 6 | public static final int |
| VK_UNDEFINED | | public static final int |

| Fig. 28A | Fig. 28B | Fig. 28C |

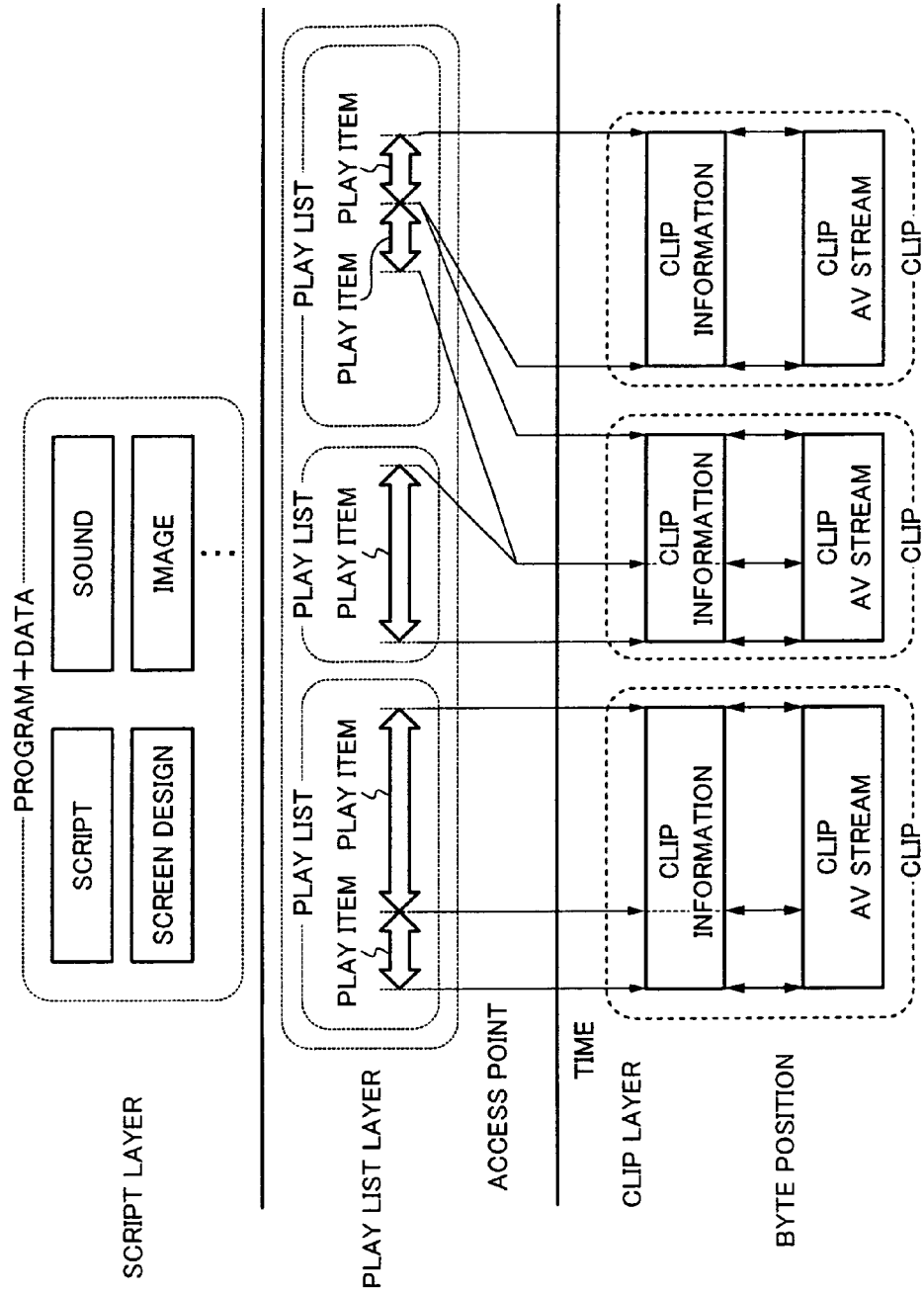

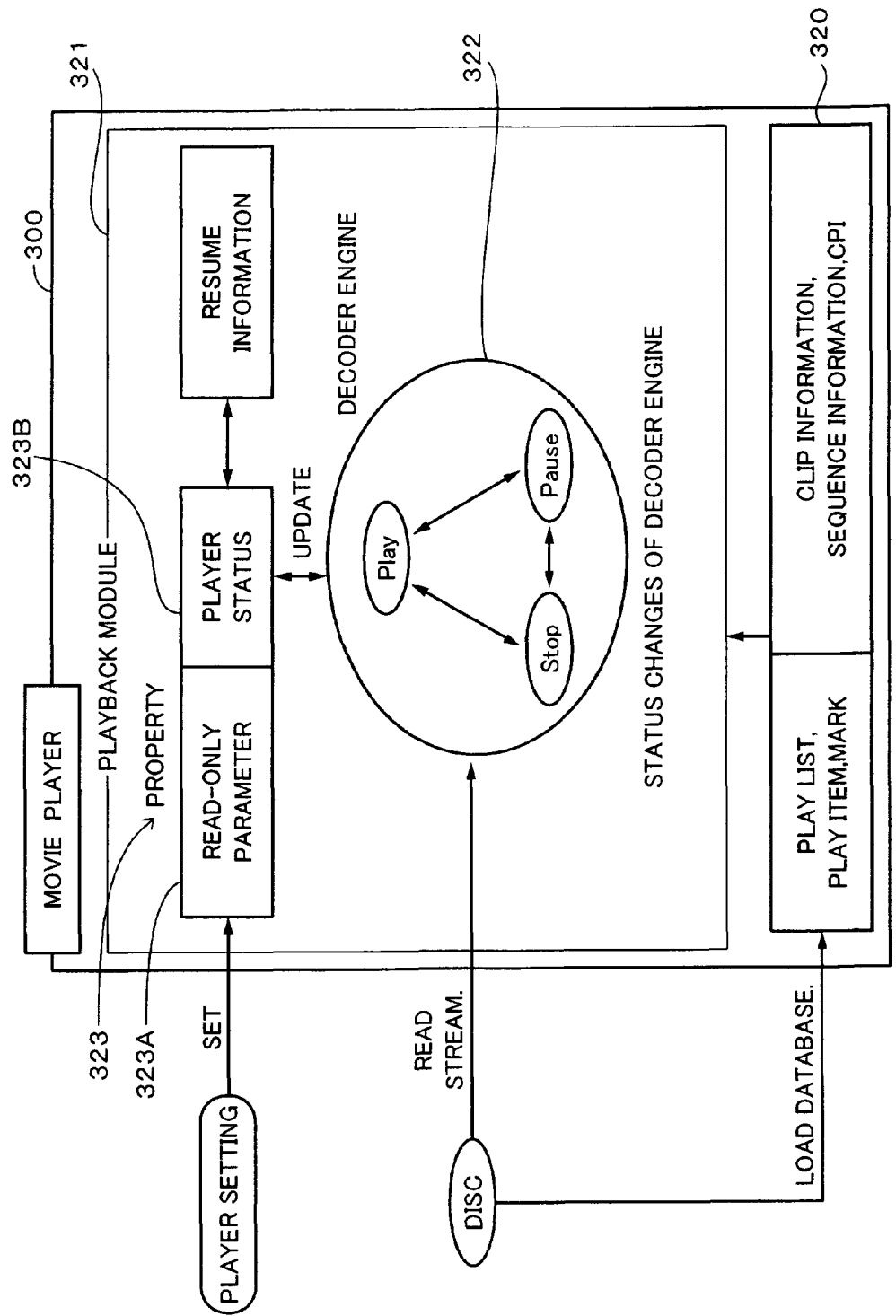

Fig. 32

| STATUS | DESCRIPTION |
|---|---|
| play | REPRESENTS THAT MOVIE PLAYER IS REPRODUCING PLAY LIST AND TIME IS ELAPSING. IN ADDITION TO REGULAR REPRODUCTION, THIS STATUS INCLUDES VARIABLE SPEED REPRODUCTION, FAST FORWARD, AND REWIND. STEP FORWARD REPRODUCTION AND STEP REVERSE REPRODUCTION REPRESENT THAT PAUSE STATUS AND PLAY STATUS ARE REPEATEDLY PREFORMED. |
| pause | REPRESENTS THAT TIME AXIS STOPS WHILE VIDEO PLAYER PLAY LIST IS REPRODUCING PLAY LIST. |
| stop | REPRESENTS THAT VIDEO PLAYER DOES NOT REPRODUCE PLAY LIST. |

Fig. 34

| Fig. 34A |
|---|
| Fig. 34B |

Fig. 34A

| EVENT HANDLER NAME | DESCRIPTION |
|---|---|
| onTimerFired() | COUNT DOWN TIMER BECOMES 0.<br>COUNT UP TIMER BECOMES DESIGNATED VALUE. |
| onPlayStopped() | REPRODUCTION STOPS. |
| onPlayStilled() | REPRODUCTION PAUSES. |
| onPlayStarted() | REPRODUCTION STARTS. |
| onPlayRepeated() | BEGINNING OF PREDETERMINED DATA IS DETECTED IN REPEAT REPRODUCTION. |
| onSPDisplayStatusChanged() | DISPLAY/NON-DISPLAY STATUS OF SUB TITLE (SUB PICTURE) STREAM IS CHANGED. |

Fig. 34B

| | |
|---|---|
| onSelectedAudioChanged() | AUDIO STREAM BEING REPRODUCED IS CHANGED. |
| onVideoStopped() | VIDEO STREAM BEING REPRODUCED IS CHANGED. |
| onPlayListStarted() | BEGINNING OF PLAY LIST IS DETECTED. |
| onPlayListEnded() | END OF PLAY LIST IS DETECTED. |
| onPlayItemStarted() | BEGINNING OF PLAY ITEM IS DETECTED. |
| onPlayItemEnded() | END OF PLAY ITEM IS DETECTED. |
| onMarkEncountered() | MARK IS DETECTED DURING REPRODUCTION. |

…

REPRODUCTION DEVICE, REPRODUCTION METHOD, REPRODUCTION PROGRAM, AND RECORDING MEDIUM

TECHNICAL FIELD

The present invention relates to a reproducing apparatus, a reproducing method, a reproducing program, and a recording medium that allow the user to interactively operate a program recorded on a large capacity type recording medium such as the Blu-ray Disc.

BACKGROUND ART

In recent years, as a standard for a disc type recording medium that is recordable and detachable from a recording and reproducing apparatus, the Blu-ray Disc standard has been proposed. The Blu-ray Disc standard prescribes a disc that has a recording medium having a diameter of 12 cm and a cover layer having a thickness of 0.1 mm. The Blu-ray Disc standard uses as optical systems a bluish-purple laser having a wavelength of 405 nm and an objective lens having a numerical aperture of 0.85. The Blu-ray Disc standard accomplishes a recording capacity of 27 GB (Giga bytes) maximum. As a result, a program of a BS digital high-vision broadcast available in Japan can be recorded for two hours or longer without deterioration of picture quality.

As sources (supply sources) of AV (Audio/Video) signals recorded on the recordable optical disc, an analog signal of for example a conventional analog television broadcast and a digital signal of for example a digital television broadcast such as a BS digital broadcast are expected to be used. The Blu-ray Disc standard has established a sub standard for a method for recording AV signals of such broadcasts.

As a derivative standard of the current Blu-ray Disc standard, there is a movement to develop reproduction-only recording mediums on which movies, music, and the like are pre-recorded. As disc-shaped recording mediums on which movies and music are pre-recorded, DVD (Digital Versatile Disc) has been widely used. The reproduction-only optical disc in accordance with the Blu-ray Disc standard is largely different from and superior to the conventional DVD in a large recording capacity and a high transfer rate that allow high-vision pictures to be recoded for two hours or longer in high quality.

The reproduction-only DVD video standard accomplishes an interactive function with button images and so forth on a menu screen. For example, while a moving picture of the DVD video is being reproduced, a process that calls a menu screen with a remote control commander or the like, selects a button image on the menu screen, and changes the reproduced scene can be performed.

In the case of the DVD video, a menu screen is composed of fixed sub picture data. When the menu screen is called, it is displayed in such a manner that the sub picture data is combined with moving picture data. Button image data is included in the sub picture, data. Patent Document "Japanese Patent Laid-Open Publication No. HEI 10-308924" describes a structure of which sub picture data is combined with moving picture data and the combined data is recorded to a recordable DVD.

However, since the reproduction-only DVD video standard prescribes operations using simple commands, it is difficult to accomplish complicated interactive functions. Thus, the creator needs much labor to accomplish the complicated interactive functions with the reproduction-only DVD video standard.

In addition, the reproduction-only DVD video standard prescribes simple program operations with a region of commands the are executed one after the other. Thus, multi-threaded programming and event-driven programming cannot be performed on the reproduction-only DVD video standard. Although the DVD video standard does not have a function that accesses a network such as the Internet, when the network access function is considered to be accomplished, since response times from the network and the user tend to be long, a multi-threaded process is very effective as a system structure to improve the performance.

In addition, in the DVD video standard, commands are embedded in an AV (Audio/Video) stream of which video data and audio data are multiplexed. As the AV stream is reproduced, the embedded commands are extracted therefrom and executed. In other words, an operation model like tracing a vine is performed. Thus, only when the user selects a button and executes a command corresponding to the button on a title selection menu screen or in a multi-story that contains branches, the next operation is decided. Thus, in the DVD video standard, high speed process techniques that pre-read commands for branch prediction and speculative execution cannot be used.

In addition, from a view point of authoring, which creates discs, the reproduction-only DVD video standard has drawbacks. Now, it is assumed that a button designed to appear at predetermined timing on an AV stream and the timing is moved forward or backward on the time axis. For example, as shown in FIG. 1, buttons designate to appear after button appearance start time t1 to button appearance end time t2 on the AV stream are changed so that the buttons appear after time t3 that is earlier than time t1.

As well known, in the reproduction-only DVD video standard, an AV stream is encoded and packetized as prescribed in the MPEG 2 (Moving Pictures Experts Group 2) standard. Timing management of a reproduction output is performed with pts (Presentation Time Stamp). In the example shown in FIG. 1, the button appearance start time is changed from pts1 corresponding to time t1 to pts3 corresponding to time t3.

In the DVD video standard, navigation information, video data, audio data, and sub picture data are individually packed and multiplexed as one AV stream. Commands and so forth are embedded in the AV stream. Video data, audio data, and sub picture data are designated to appear at their multiplexed times. For example, as shown in FIG. 2A, these data are multiplexed so that predetermined data are reproduced at their predetermined times on the time axis managed at pts intervals.

Since the data are multiplexed in such a manner, when button A designated to appear at time pts1 is changed so that it appears at time pts3, the AV stream shown in FIG. 2A should be re-multiplexed so that sub picture data of button 1 appears at time pts3. When the contents of a command that is executed when a button is selected are changed, the AV stream should be re-multiplexed. When an AV stream is re-multiplexed, it needs to be reproduced by a DVD player and temporarily stored in a memory of the player.

Thus, conventionally, it is difficult to accomplish interactive functions having a higher degree of freedom. To accomplish them, the creator side needs much labor.

DISCLOSURE OF THE INVENTION

An object of the present invention is to provide a reproducing apparatus, a reproducing method, a reproducing program, and a recording medium that allow interface functions with a high degree of freedom for large storage capacity type reproduction-only optical discs to be easily accomplished.

The present invention is a reproducing apparatus that reproduces content data hierarchically recorded on a disc-shaped recording medium, comprising: a player object that generates an event corresponding to a predetermined change; and a program object that is formed above said player object and that is capable of describing a process corresponding to the event that takes place, wherein said player object controls a reproduction process for content data hierarchically recorded on the disc-shaped recording medium with a process corresponding to the event described in said program object.

In addition, the present invention is a reproducing method of reproducing content data hierarchically recorded on a disc-shaped recording medium, comprising the step of: causing a player object that generates an event corresponding to a predetermined change to control a reproduction process for content data hierarchically recorded on the disc-shaped recording medium with a process corresponding to the event described in a program object that is formed above the player object and that is capable of describing a process corresponding to the event that takes place.

In addition, the present invention is a reproducing program that causes a computer device to execute a reproducing method of reproducing content data hierarchically recorded on a disc-shaped recording medium, comprising the step of: causing a player object that generates an event corresponding to a predetermined change to control a reproduction process for content data hierarchically recorded on the disc-shaped recording medium with a process corresponding to the event described in a program object that is formed above the player object and that is capable of describing a process corresponding to the event that takes place.

In addition, the present invention is a computer readable recording medium on which a reproducing program has been recorded, the reproducing program causing a computer device to execute a reproducing method of reproducing content data hierarchically recorded on a disc-shaped recording medium, comprising the step of: causing a player object that generates an event corresponding to a predetermined change to control a reproduction process for content data hierarchically recorded on the disc-shaped recording medium with a process corresponding to the event described in a program object that is formed above the player object and that is capable of describing a process corresponding to the event that takes place.

In addition, the present invention is a disc-shaped recording medium on which content data have been hierarchically recorded, at least content data and a program object that is capable of describing a process corresponding to an event that takes place being recorded on the recording medium, a reproduction process for the content data being controlled with a process corresponding to the event described in the program object by a player object that generates an event corresponding to a predetermined change and formed below the program object.

As described above, in claim 1, claim 13, claim 14, and claim 15 of the present invention, a player object generates an event corresponding to a predetermined change to control a reproduction process for content data hierarchically recorded on the disc-shaped recording medium with a process corresponding to the event described in a program object that is formed above the player object and that is capable of describing a process corresponding to the event that takes place. Thus, one player object is capable of performing a reproduction control for an original process for each disc-shaped recording medium.

In addition, in claim 16 of the present invention, at least content data and a program object that is capable of describing a process corresponding to an event that takes place are recorded on the recording medium. A reproduction process for the content data is controlled with a process corresponding to the event described in the program object by a player object that generates an event corresponding to a predetermined change and formed below the program object. Thus, one player object is capable of performing a reproduction control for an original process for each recording medium.

According to the present invention, a virtual player that abstractly forms an AV stream reproduction function of a BD-ROM player is structured. Events that take place in an event model applied to the virtual player are designated. In addition, user events corresponding to user inputs are defined. Thus, with one event model, functions of the DVD video can be accomplished.

In addition, according to the present invention, a virtual player that abstractly forms an AV stream reproduction function of the BD-ROM player is structured. A Java class corresponding to the virtual player is defined. Events that take place in an event model applied to the virtual player are designated. In addition, user events corresponding to user inputs are defined. Thus, as a reproduction control method for a reproduction-only video disc, event models of Java can be applied. As a result, with a Java program, the reproduction of a play list can be controlled.

Thus, to implement complicated interactive functions, the disc creator side does not need much labor.

In addition, the present invention can be applied not only to the Java language, but to a script language such as the ECMA script. The content creator side can describe contents of event handlers corresponding to events using a script language. As a result, when an event takes place, an operation that the content creator side desires can be easily accomplished.

BRIEF DESCRIPTION OF DRAWINGS

FIG. 2A and FIG. 2B are schematic diagrams describing re-multiplication of a stream;

FIG. 3A and FIG. 3B are schematic diagrams showing an example of a layer structure of a HD movie mode of the BD-ROM standard;

FIG. 5 is a schematic diagram describing a BD basic player 30;

FIG. 6 is a schematic diagram showing examples of events that take place while a play list is being reproduced;

FIG. 7 is a schematic diagram showing list of examples of methods of class BDBasicPlayer;

FIG. 8A, FIG. 8B, and FIG. 8C are schematic diagrams showing a list of examples of methods of class BDBasicPlayer;

FIG. 9 is a schematic diagram showing a list of examples of methods of class BDBasicPlayer;

FIG. 10 is a schematic diagram showing a list of examples of methods of class BDBasicPlayer;

FIG. 11 is a schematic diagram showing a list of examples of methods of class BDBasicPlayer;

FIG. 12 is a schematic diagram showing a list of examples of methods of class BDBasicPlayer;

FIG. 14A, FIG. 14B, and FIG. 14C are schematic diagrams showing a list of examples of definitions of events that take place in object BDBasicPalyer of the D-ROM;

FIG. 15 is a schematic diagram describing an event and a listener;

FIG. 16A and FIG. 16B are schematic diagrams showing a list of examples of methods with respect to event listener registration;

FIG. 21A, FIG. 21B, FIG. 21C, and FIG. 21D are schematic diagrams showing a list of examples of definitions of user input commands that the BD-ROM virtual player model accepts;

FIG. 22 is a schematic diagram showing an example of class RmtKeyEvent of key input events of a remote control commander;

FIG. 23 is a schematic diagram showing a list of examples of methods of object RmtKeyEvent;

FIG. 24 is a schematic diagram showing a list of examples of keys obtained with method getRmtKeyCode;

FIG. 25A and FIG. 25B are schematic diagrams showing a list of examples of keys obtained with method getRmtKeyCode;

FIG. 29 is a schematic diagram showing a layer structure of the UMD video standard;

FIG. 31 is a schematic diagram showing an example of an internal structure of a movie player;

FIG. 32 is a schematic diagram showing three statuses of the movie player;

FIG. 34A and FIG. 34B are schematic diagrams showing a list of examples of event handlers of a movie player object.

BEST MODES FOR CARRYING OUT THE INVENTION

Figure 1:
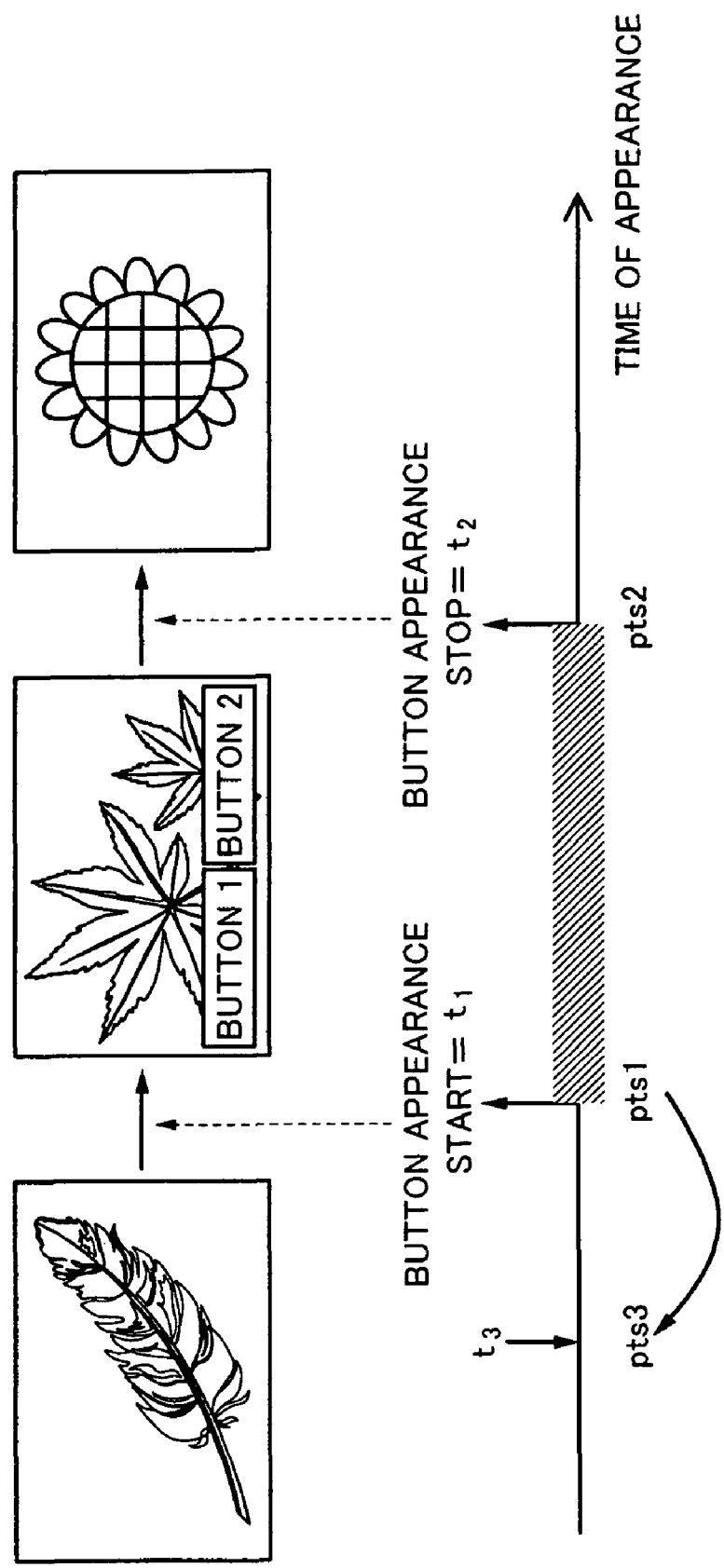
FIG. 1 is a schematic diagram describing a change of an appearance start time of a button according to related art.

Next, the present invention will be described corresponding to the following structure.
1. First embodiment of present invention
1-1. About AV steam reproduction functions of BD-ROM
1-1a. About HD movie mode of BD-ROM
1-1b. About full profile of BD-ROM
1-2. BD virtual player model based on Java 1-3. About events generated by BD basic player
1-3a. Categories of events
1-3b. About event models
1-4. About user inputs
1-5. About file management structure
1-6. About decoder model
2. Second embodiment of present invention
2-1. About UMD video standard
2-2. About player model based on UMD video standard
2-3. About event model of movie player
2-4. About movie player object and user input
2-5. About event handling by movie player object 1. First Embodiment of Present Invention Next, a first embodiment of the present invention will be described. For easy understanding of the present invention, a standard for a reproduction-only record medium will be briefly described as a derivative of the current Blue-ray Disc standard. In the following description, the reproduction-only record medium as a derivative of the Blue-ray Disc standard is named the BD-ROM (Blu-ray Disc Read Only Memory) to distinguish it from a recordable Blu-ray disc. The BD-ROM standard prescribes HD (High Definition) movie mode that provides interactive functions similar to those of the DVD video.

1-1. About AV Steam Functions of BD-ROM 1-1a. About HD Movie Mode of BD-ROM

FIG. 3A and FIG. 3B show an example of a layer structure of the HD movie mode of the BD-ROM standard. The HD movie mode of the BD-ROM standard is composed of a clip layer, a play list layer, a movie object layer, and an index table layer formed in succession from the lowest layer.

The clip layer is composed of one or a plurality of clips. A clip is composed of a clip AV stream and clip information. The entity of an AV stream is a clip AV stream file. An AV stream is recorded in an MPEG (Moving Pictures Experts Group 2) transport stream with a time stamp. A clip AV stream file can be multiplexed with button objects for button images.

When a clip AV stream file is recorded, a clip information file corresponding thereto is created in the relationship of 1 to 1. A set of one clip AV stream file and one clip information file is referred to as a clip.

A clip is a record unit. The reproduction order of clips is controlled in an upper layer of clips. The play list layer is a layer in which the reproduction path of clips is designated. The play list layer contains one or a plurality of play lists. In the HD movie mode of the BD-ROM standard, only one type of a play list referred to as a movie play list exists. A movie play list is composed of a set of play items. A play item contains a set of an IN point and an OUT point that represent the reproduction range of a clip. With a plurality of play items, clips can be reproduced in any order. Play items can designate the same clip. The IN point and OUT point of a clip AV stream file are designated with byte positions.

The movie object exists above the play list layer. The movie object layer is composed of one or a plurality of movie objects. A movie object is composed of a play list reproduction command and a set of player set commands. With commands contained in a movie object, a play list reproduction that reproduces a stream in a selected language or that has conditional branches that cause play lists to be selected to vary corresponding to predetermined conditions can be accomplished. An example of an application that performs a play list reproduction that has conditional branches would be a multi-story. Thus, movie objects provide interactivity.

The index table layer contains an index table and exists above the play list layer. The index table is composed of a movie object that is first executed when the disc is loaded into the player, a movie object that is executed when the menu key is pressed, and a list of titles that the user can watch. The index table provides a user interface. A title is composed of one or a plurality of movie objects. The index table lists movie objects that are first executed in titles. The player decides a movie object that it first executes in each operation on the basis of the index table.

Formed on the disc in the HD movie mode of BD-ROM is the foregoing database. The player reads the database from the disc and performs the designated operation.

Figure 4:
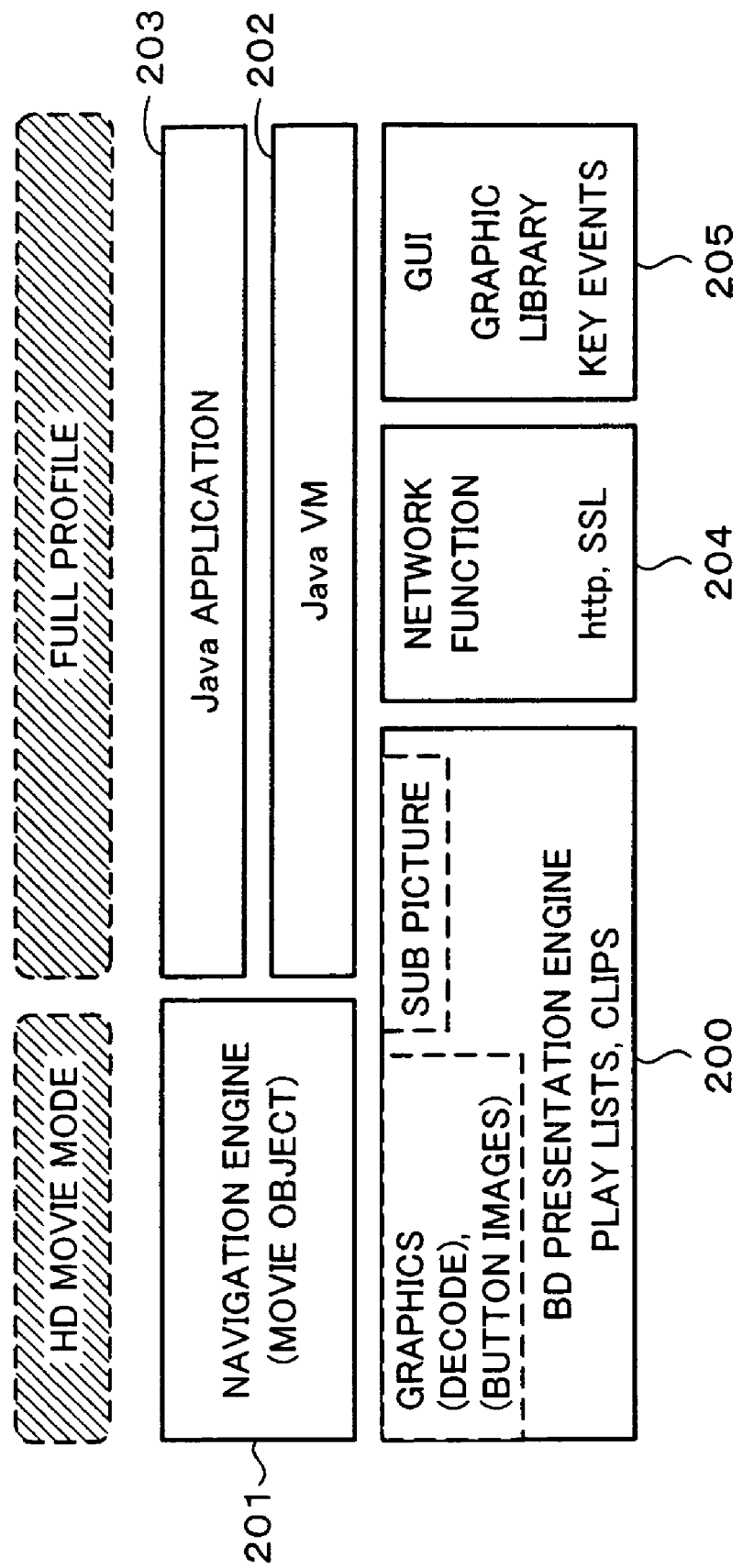
FIG. 4 is a schematic diagram showing an example of a layer structure of a BD-ROM player.

Next, a model of the player side will be described. In reality, various implement models of players are considerable. In this example, a player model is divided into a hardware-like functional block that reproduces a stream and a software functional block that interprets and executes commands and that exists above the software-like functional block. FIG. 4 shows an example of a layer structure of a player model of the BD-ROM. The left portion of FIG. 4 shows the layer structure, which is divided into two functional blocks in the HD movie mode.

A BD presentation engine 200 is a functional block that handles play lists and clips, decodes an AV stream, and reproduces a moving picture and sound data. The BD presentation engine 200 also decodes a sub title stream and a graphics stream for button images and menus.

The BD presentation engine 200 reproduces a designated play list corresponding to a command received from the upper layer.

In the HD movie mode of the BD-ROM, a navigation engine 201 exists above the BD presentation engine 200. The navigation engine 201 interprets an index table and movie objects and informs the BD presentation engine 200 of a play list that is finally reproduced.

1-1b. About Full Profile of BD-ROM

Next, a full profile of the BD-ROM standard will be described. The full profile of the BD-ROM standard is a mode that has a higher degree of freedom and expansibility than the HD movie mode of the BD-ROM standard. Hereinafter, the full profile mode of the BD-ROM standard is referred to as the full profile.

According to the first embodiment of the present invention, the player model is provided with a Java virtual machine (Java VM) and executes a Java application to accomplish the full profile for higher degree of freedom and expansibility. This point is largely different from the HD movie mode of the BD-ROM. Java, JavaVM, and so forth are registered trademarks of Sun Microsystems, Inc.

The full profile needs to use all the functions of the player. An API (Application Programming Interface) is defined between the BD presentation engine 200 and a Java application. Thus, the BD presentation engine 200 can be operated through the API. Like the navigation engine 201 in the HD movie mode of the BD-ROM, the Java application can be thought to exist above the BD presentation engine 200. In other words, as illustrated on the right portion of FIG. 4, in the full profile, a Java application 203 exists above the BD presentation engine 200 through a Java VM 202.

In addition, Java also has a network function and a graphics function. Thus, there are a network layer 204 and a GUI (Graphical User Interface) layer 205 as lower layers of the Java application 203 and the Java VM 202.

When the BD presentation engine 200 is operated with the Java application 203, it can be thought that the player that reproduces a play list is a virtual player on the software, commands for playback, stop, stream selection, and so forth are sent to the player, and the player is operated with the commands. The player needs to inform the player of the current status of the player as to which play list the player is reproducing and what times various operations such as stream selections and user inputs will change. According to the first embodiment of the present invention, these functions of the player are considered as abstractive objects on the Java application 203. The abstractive objects of the functions of the player are referred to as the BD basic player.

Next, with reference to FIG. 5, a BD basic player will be described. A BD basic player 30 reproduces data from a disc-shaped recording medium defined in the first embodiment of the present invention. The BD basic player 30 is an object such as a personal computer on the computer environment. The computer environment is not limited to a general purpose personal computer. For example, the computer environment includes a software environment implemented in a dedicated reproducing apparatus and/or a recording and reproducing apparatus that reproduces data from a disc-shaped recording medium defined in the first embodiment of the present invention. Hereinafter, the disc-shaped recording medium according to the first embodiment of the present invention is abbreviated to the disc.

The BD basic player 30 is an abstractive object on the software. Below the BD basic player 30, an OS (Operating System) and hardware 33 exist. As a superordinate program of the BD basic player 30, there is a Java program 31 through an API 32.

The BD basic player 30 has two statuses A and B. In status A, a play list and graphics can be reproduced. In status B, their reproduction is stopped. Status A includes a plurality of operations such as variable speed reproductions for example high speed reproduction and reverse reproduction and jump reproduction that reproduces data from any time point on the disc. In addition, the BD basic player 30 contains variables that hold statues of the player (common parameters 34). The common parameters 34 are composed of registers and so forth on the computer environment. When an application (Java program 31) on the upper layer accesses the common parameters 34 through a method of Java, the application can perform a process corresponding to the status of the BD basic player 30.

The BD basic player 30 is an abstractive object on the software. The BD basic player 30 finally converts control by the Java program 31 through the API 32 to control by the OS and the hardware 33 that exist in the lower level.

The BD basic player 30 needs to be controlled by a superordinate program (Java program 31) through the API 32. In addition, the BD basic player 30 needs to inform the superordinate program that the status of the BD basic player 30 changes. In other words, when the BD basic player 30 performs a plurality of operations that successively reproduces one play list and then another play list, the superordinate program needs to have known the status of the BD basic player 30. According to the first embodiment of the present invention, as a mechanism that informs the upper layer of the status of the player, event models are used.

FIG. 6 shows examples of events that may take place while a play list is being reproduced. When the reproduction is started, event PlayStarted takes place. Thereafter, when the reproduction of a play list is started, event PlayListStarted takes place. Since the beginning of a play list is also the beginning of a play item, when event PlayListStared takes place, event PlayItemStared also takes place. If a chapter mark that presents a chapter is present at the beginning of the play list, event MarkEncountered takes place.

Likewise, if a mark is present in a play item, while a play item is being reproduced, the mark is detected. Thus, event MarkEncountered takes place. When the reproduction of the play item has been completed, event PlayItemEnded takes place. When the reproduction of the play list has been also completed, event PlayListEnded takes place. When the reproduction has been completed, event PlayEnded takes place.

Thus, while the player is being operated, various events take place. When the superordinate program is informed of occurrence of an event, the superordinate program can know the status of the player. The superordinate program side prepares programs that are executed when it is informed of occurrence of events, it can deal with occurrence of the events.

According to the first embodiment of the present invention, an abstracting method for a player, method models that allow a Java program to operate the player, and event models that inform the Java program of the status of the player are provided. The Java language is implemented to a control program of the BD-ROM. In the system according to the first embodiment of the present invention, the disc creator creates the Java program 31 that operates the BD basic player 30 through the API 32.

Next, a practical example of which functions of the player are analyzed in detail, abstracted, and represented as classes of Java will be described.

1-2. BD Virtual Player Model Based on Java

To designate the full profile of the BD-ROM, it is necessary to define an execution environment for the Blu-ray Disc. An ideal model of the BD basic player 30 that reproduces data from the BD-ROM is named the BD-ROM virtual player model. The BD basic player 30 corresponds to a functional block that reproduces a play list of the BD-ROM virtual player model. In the BD-ROM virtual player model, statuses and conditions for the status changes are defined. In addition, attributes of streams reproduced by the BD basic player 30, a commandless (script) description method that controls streams, and so forth are defined. Scripts and streams recorded in the BD-ROM should be correctly operated on the BD-ROM virtual player model.

Although a real BD-ROM player can be installed in various manners, when a model that does not need to be installed is considered, minimally required hardware resources can be clarified.

The BD-ROM virtual player model defined in the first embodiment of the present invention uses Java as a programming language that controls the BD basic player 30. Java is a programming language created by Sun Microsystems, Inc and has a plurality of editions such as J2EE, J2SE, J2ME, and so forth that differ in their applicable system scales. In this example, it is assumed that J2ME, which is an edition designed to be installed to a set top box and so forth, is used for the BD-ROM virtual player model. In other words, the BD-ROM virtual player model is extended on the basis of J2ME.

As a feature of the Java language, when a new class is defined for a program, it can be easily extended. Assuming that an HTML (Hyper Text Markup Language) document does not support an event process. To allow this HTML document to support the event process, a script for the event process, for example an ECMA (European Computer Manufacturers Association) script, is described in the HTML document.

When the Java language is used, a function can be added corresponding to an extension method defined in the Java language without using a plurality of techniques that accomplish the function. Thus, a completed program is described in only the Java language. In addition, Java has already provided various program development environments. Thus, it can be said that the disc creator can easily create disc contents.

When the BD-ROM virtual player model is described in the Java language, API, a class that has been defined by Sun Microsystems, Inc., can be used as it is. On the other hand, the BD basic player 30 is an original function of the BD-ROM. Thus, Java does not provide the BD basic player 30 as an existing class and API. When this original function of the BD-ROM is accomplished by Java, there may be various methods. However, according to the first embodiment of the present invention, functions of the BD basic player 30, API, event models, and so forth are created corresponding to the BD-ROM.

First, the BD basic player 30 is defined as one class of Java. The name of the class is defined as BDBasicPlayer. FIG. 7 to FIG. 13 show lists of examples of methods of class BDBasicPlayer. All commands for the BD basic player 30 are performed with these methods.

FIG. 7 shows examples of methods used to obtain player set information. Method getPlayerSpeed( ) obtains the reproduction speed of the player. Method getPlayerDirection( ) obtains the reproduction direction of the player. Method getDescriptionLanguage( ) obtains the display language of the player. Method getPlayListNumber( ) obtains the play list number that is currently being reproduced. Method getChapterNumber( ) obtains the chapter number that is currently being reproduced. Method getPlayerSupport( ) obtains the version and functions, of the player.

FIG. 8A, FIG. 8B, and FIG. 8C show examples of methods used to reproduce play lists. Method playPlayList(int playListNumber, long[playListTime]) starts the reproduction of a play list designated by "playListNumber." "playListNumber" is not essential. "playListTime" designates an elapsed time of the play list. The play list is reproduced from the elapsed time "playListTime." Method playPlayList(String playListURL, long[PlayListTime]) starts the reproduction of a play list designated by "playListURL." "playListURL" is a play list designated by a URL (Uniform Resource Locator). A play list on the Internet can be designated by a URL. When the player has an Internet connection function, a play list can be downloaded from a URL designated by "playListURL" and reproduced. "playListTime" is not essential. "playListTime" designates an elapsed time of the play list. The play list is reproduced from the elapsed time "playListTime."

Method playPlayItem(int playListNumber, int playItemNumber) starts the reproduction of a play list designated by "playListNumber" from a play item designated by "palyItemNumber." "playItemNumber" is "PlayItem_id" that identifies a play item and that is a numeric value starting from 0. When the reproduction is started from the beginning of a play list, the value of "playItemNumber" is 0. Method playPlayItem (String playListURL, int playItemNumber) starts the reproduction of a play list designated by "playListURL" from a play item designated by "playItemNumber." "playItemNumber" is "PlayItem_id" that is a numeric value starting from 0. When the reproduction started from the beginning of a play list, the value of "playItemList" is 0.

Method playChapterMark(int playListNumber, int chapterNumber) reproduces a play list designated by "playListNumber" from a chapter designated by "chapterNumber." "playListNumber" may be "playListURL." A play list always starts with ChapterMark (chapter mark).

Method moveAndPlay(string position, object) position= ("prev"|"next"|"top"|"tail") object=("PlayItem"|"Chapter") designates a jump in a play list. "next" designates a jump from the currently reproduced position to the next play item or chapter and starts the reproduction thereof. "top" designates a jump from the currently reproduced position to the end of the play list. "prev" starts the reproduction from the beginning of the currently reproduced play list. Method stop( ) stops the reproduction. At this point, the value of the standard resistor is not kept. Method playSoundEffect(int sound_id) reproduces a sound effect selected by "sound_id."

FIG. 9 shows examples of methods used for video streams. Method getVideoStreamAvailability( ) obtains a status representing whether or not a designated video stream is contained. Method setVideoStreamNumber( ) designates a video stream to be decoded. Method getVideoStreamNumber( ) obtains a video stream number that has been selected. Method getVideoStreamAttribute( ) obtains attributes of a video stream. The attributes of a video stream are for example encoding system, resolution, aspect ratio, display mode in the case of an aspect ratio of 4:3, closed caption, and so forth. Method setAngleNumber( ) designates an angle number. Method getAngleNumber( ) obtains an angle number that has been selected. Method getMaxVideoStreams( ) obtains the number of video streams that can be selected.

FIG. 10 shows examples of methods used for audio streams. Method getAudioStreamAvailability( ) obtains a status representing whether or not a designated audio stream is contained. Method getAudioStreamLanguage( ) obtains information about the language used in a designated audio stream. Method setAudioStreamNumber( ) designates an audio stream to be reproduced. Method getAudioStreamNumber( ) obtains an audio stream number that is being reproduced. Method getAudioStreamAttribute( ) obtains attributes of an audio stream. The attributes of an audio stream are for example encoding system, number of channels, number of quantizer bits, sampling frequency, and so forth. Method getMaxAudioStreams( ) obtains the number of audio streams that can be obtained.

FIG. 11 shows examples of methods used for sub picture streams. Method getSPStreamAvailability( ) obtains a status representing whether or not a designated sub picture stream is contained. Method getSPStreamLanguage( ) obtains the language used in a designated sub picture stream. Method getSPDisplayStatus( ) obtains a display status of a sub picture stream, namely whether or not it is currently being displayed. Method setSPDisplayStatus( ) sets a display status of a sub picture stream, namely whether or not to display it. Method getSPStreamAttribute( ) obtains attributes of a sub picture stream. The attributes of a sub picture stream are for example information about resolutions of sub picture streams, information about an aspect ratio of 4:3 or wide type, and so forth.

FIG. 12 shows examples of methods used for internal timers. Method sleep( ) stops a process for designated milliseconds. Method setTimeout( ) executes a function or a process after designated milliseconds elapse. Method setinterval( ) executes a process at intervals of predetermined milliseconds. Method clearTimer( ) stops a process of a designated registration timer ID. Method pauseTimer( ) pauses a timer having a designated registration timer ID. Method resumeTimer( ) resumes a paused timer having a designated registration timer ID.

Figure 13:
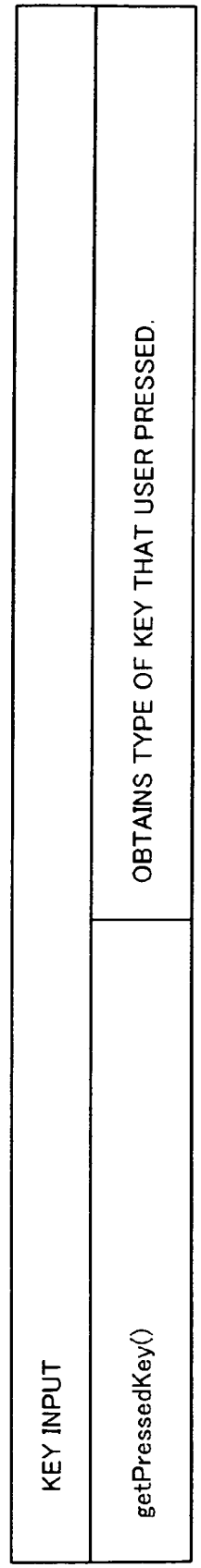
FIG. 13 is a schematic diagram showing a list of examples of methods of class BDBasicPlayer.

FIG. 13 shows an example of a method used for a key input. Method getPressedKey( ) obtains the type of a key that the user pressed.

1-3. About Events Generated by BD Basic Player

When a method for a player operation is executed, if the reaction of the player operation is obtained for example as to whether the operation of the player has been normally started, a return value of the method can be used. However, if a process that takes a long time is designated and it is necessary to wait until the process is completed, another process cannot be performed. In addition, there are processes whose start times are unpredictable. In these cases, a technique of events can be used to effectively perform processes.

While the player is operating, various events take place. Events that take place are defined in the BD-ROM virtual player model. A model of which when the operation of the player varies, an event takes place and when there is a program corresponding to an event, the program is executed is defined by the BD-ROM virtual player model.

When a plurality of play lists are reproduced in a predetermined order, a program that performs a process that starts the reproduction of a play list after receiving an event that represents that the reproduction of the preceding play list has been completed is provided. In addition, a program that performs an exception process when the next play list is not reproduced due to any cause is provided.

When such an event is not described, an operation (a default event handler) that is built in the player is executed or the event is ignored. When it is not necessary to perform any process, the event is actively ignored. At this point, an event listener (that will be described later) is not registered. Alternatively, when a program corresponding to the event is not described, the event is ignored.

A model of which an non-periodic event takes place and a program corresponding to the event is executed is referred to as the event driven model.

1-3a. Categories of Events

Events of the BD-ROM virtual player model can be categorized as three types of (1) events that take place in a content that is being reproduced, (2) an event that takes place as an interrupt by the user, and (3) events that take place corresponding to status changes of the player.

(1) Events that take place in a content that is being reproduced are mark detection interrupt events that take place at times designated by marks. When these events take place, graphics are displayed or erased. These events are pre-set interrupts. Whenever the reproduction is performed, these event take place at the same timings.

(2) An event that takes place as an interrupt by the user is supposed to be a key input to a remote control commander with which the user operates the player. Interrupt timing of this event is unpredictable since it is not clear at what time the user will perform a key input.

(3) Events that take place corresponding to status changes of the player are for example an event that takes place when the status of the player changes from the stop starts to the reproduction status and an event that takes place when a stream that is being reproduced was changed to another stream. When a timer is set in a program, a timer interrupt event takes place at a designated time. Status changes of the player may be (1) events that take place in a content that is being reproduced and (2) an event that takes place as an interrupt by the user.

FIG. 14A, FIG. 14B, and FIG. 14C show a list of examples of definitions of events that take place in object BDBasicPlayer of the BD-ROM. Object BDBasicPlayer is an object that takes place in class BDBasicPlayer.

First, (1) events that take place in a content that is being reproduced will be described. In FIG. 14A, FIG. 14B, and FIG. 14C, event MarkEncounteredEvent takes place when a mark was detected while a content was being reproduced. This event is used when for example a graphics screen is displayed. Event ValidPeriodStartedEvent takes place when a selection valid period of a user input started. Event Valid PeriodEndedEvent takes place when a valid period of a user input ended. This event is used when for example a link is forcedly executed. Event PlayRepeatedEvent takes place when the beginning of a repeat reproduction region was detected. Event VideoStreamChangedEvent takes place when a video stream that was being reproduced was changed. Event AudioStreamChangedEvent takes place when an audio stream that was being reproduced was changed. Event SubpictureStreamChangedEvent takes place when a sub picture stream that was being reproduced was changed. Event StreamDisplayStatusChangedEvent takes place when the display/non-display status of a stream was changed. Event PlayListStartedEvent takes place when the beginning of a play list was detected. Event PlayListEndedEvent takes place when the end of a play list was detected. Event PlayItemStartedEvent takes place when the beginning of a play item was detected. Event PlayItemEndedEvent takes place when the end of a play item was detected.

Next, (2) an event that takes place as an interrupt by the user will be described. Event RmKeyEvent takes place when a key of the remote control commander was pressed. A key that was pressed is determined with a corresponding event listener (that will be described later).

Next, (3) events that take place corresponding to status changes of the player will be described. Event PlayStartedEvent takes place when the player started the reproduction. Event PlayStoppedEvent takes place when the player stopped the reproduction. Event PlayStilledEvent takes place when the player stilled the reproduction. Event StillReleaseEvent takes place when the player released the stilled status of the reproduction. Event PlayPausedEvent takes place when the reproduction of the player was paused by the user. Event PauseReleaseEvent takes place when the paused status was released. Event TimerFiredEvent takes place when a count down timer became 0 or a count up timer became a predetermined value.

1-3b About Event Models

It is supposed that the events described in FIG. 14A, FIG. 14B, and FIG. 14C take place in object BDBasicPlayer. In other words, it is supposed that an event source of the Java language is object BDBasicPlayer. Events are defined as event objects in the Java language. A method that is executed when an event takes place is called a listener. To execute a listener, it is necessary to register an event listener to an event source. When a listener has been registered to an event source, object BDBasicPlayer transmits an event to the event listener. The object that has received the event executes a method provided in the object.

Next, with reference to FIG. 15, listeners and events will be described. Objects 211, 211, . . . and so forth have a listener interface that receives an event and executes a listener. The object 211 registers a listener corresponding to an event that the object 211 desires to receive to object BDBasicPlayer 210 (step S10). A registration of a listener corresponding to an event to object BDBasicPlayer 210 is named the event listener registration. The plurality of objects 211, 211, . . . , and so forth can perform the event listener registration to object BDBasicPlayer 210.

An object that implements a listener interface is an object that implement a method that is executed when an event takes place. In the example shown in FIG. 15, method doAction( ) that is executed when a predetermined event takes place is implemented to the object 211. When an event took place in object BDBasicPlayer 210 (at step S11) and the event has been registered to object BDBasicPlayer 210 as an event listener, the event is transmitted to the object 211 that has been registered as an event listener (at step S12). The object 211 that has received the event executes method doAction( ) (at step S13).

FIG. 16A and FIG. 16B show a list of examples of methods used to register event listeners. Method addContentListener (ContentsListener 1) registers a designated listener to object BDBasicPlayer to receive event ContentsEvent from object BDBasicPlayer. The registered listener is added to array ContentsListener( ). Event ContentsEvent is a general term of (1) events that take place in a content being reproduced. Method addRmtKeyListener(RmtKeyListener 1) registers a designated listener to receive event RmtKeyEvent ((2) an event that takes place as an interrupt by the user, described in FIG. 14A, FIG. 14B, and FIG. 14C) from object BDBasicPlayer. The registered listener is added to array RmtKeyListener( ). Method addPlayerStatusListener(PlayerStatusListener 1) registers a designated listener to receive event PlayerStatusEvent from object BDBasicPlayer. The registered listener is added to array PlayerStatusListener( ). Event PlayerStatusEvent is a general term of (3) events that take place corresponding to status change of the player, described in FIG. 14A, FIG. 14B, and FIG. 14C.

Method removeContentListener(ContentsListener 1) removes a designated listener not to receive event Contents Event from object BDBasicPlayer. Method removeRmtKeyListener(RmkKeyListener 1) removes a designated listener not to receive event RmtKeyEvent from object BDBasicPlayer. Method removePlayerStatusListener(PlayerStatusListener 1) remotes a designated listener from object BDBasicPlayer not to receive event PlayerStatusEvent from object BDBasicPlayer.

When a method starting with "add" is executed, an event listener is registered. An event listener is registered before a desired event takes place. When an event does not need to be received, with a method starting with "remove," the transmission of the event can be stopped.

In FIG. 16A and FIG. 16B, method getContentsListeners( ) returns an array of all content listeners registered in object BDBasicPlayer. Method getRmtkeyListeners( ) returns an array of all RmtkeyListeners registered in object BDBasicPlayer. Method getPlayerStatusListeners( ) returns an array of all PlayerStatusListeners registered in object BDBasicPlayer.

Next, an example of a program created using the event listener registration will be described. In this example, a program that causes buttons to appear at a designated scene of a play list that is being reproduced is created. To determine that a predetermined scene is being reproduced in a play list, a mark function can be used. The mark function is a function that can set any time of a play list. When a marked scene is about to be reproduced, event MarkEncounteredEvent described in FIG. 14A, FIG. 14B, and FIG. 14C takes place. A button object that implements a listener interface that causes a button to appear when event MarkEncounteredEvent takes place may be created. In other words, a program that registers an event listener to object BDBasicPlayer and causes an image to appear when event MarkEncounteredEvent is received may be implemented to the object of the button.

Figure 17:
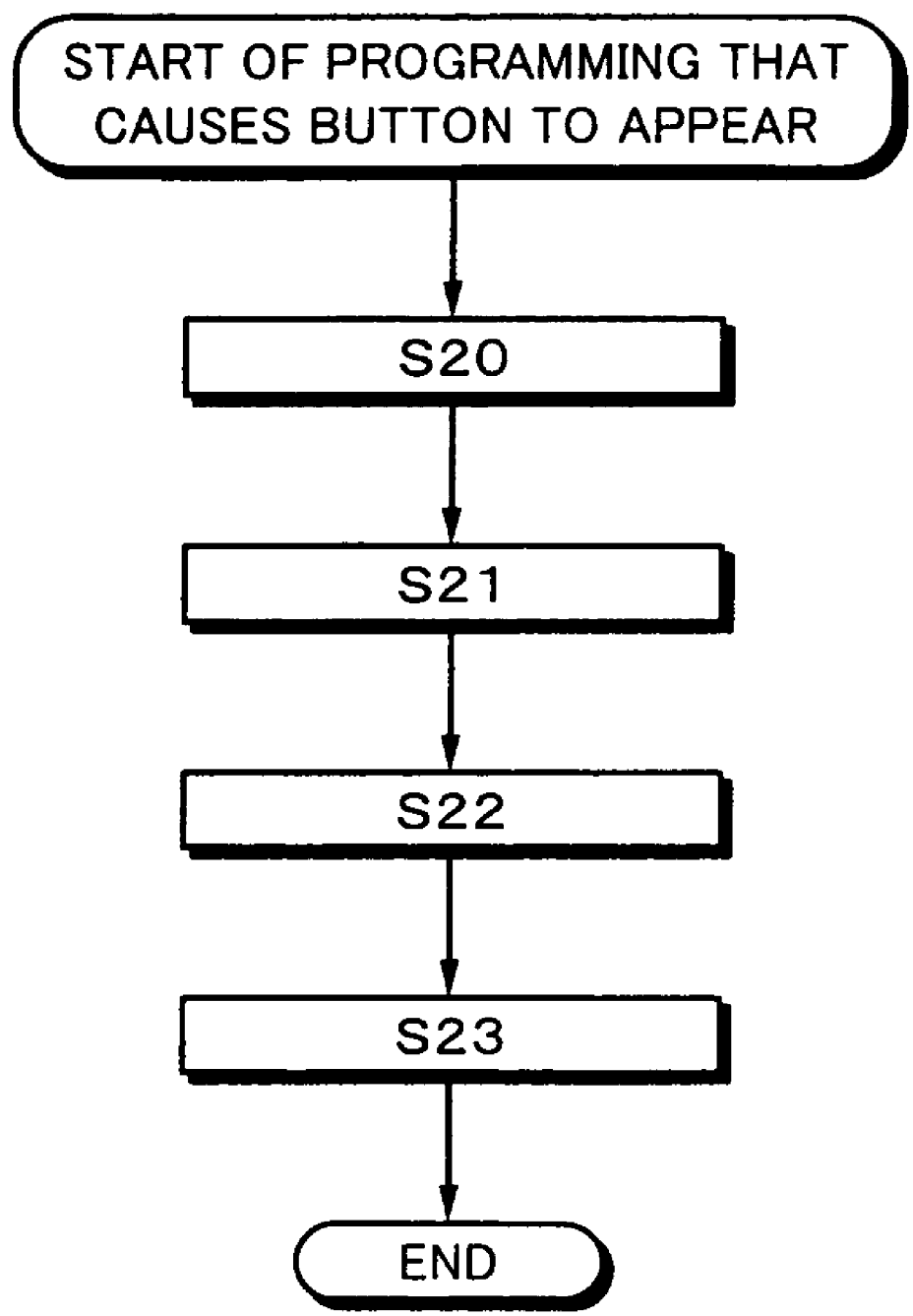
FIG. 17 is a flow chart showing an example of a process that creates a program using event listener registration.

More practically, as exemplified in FIG. 17, it is decided at what scene of a play list a button appears (at step S20). A mark is set at the time the button appears in the play list (at step S21). Next, a method that registers an event listener corresponding to the mark that has been set at step S21 is described in the program (at step S22). In other words, at step S22, the operation performed at step S10 shown in FIG. 15 is described. A process that is executed when an event takes place is described in the button object. The listener interface corresponding to the mark generation event is implemented to the button object (at step S23). In other words, at step S23, the content of step S13 is described. These programs are described in the Java language.

Figure 18:
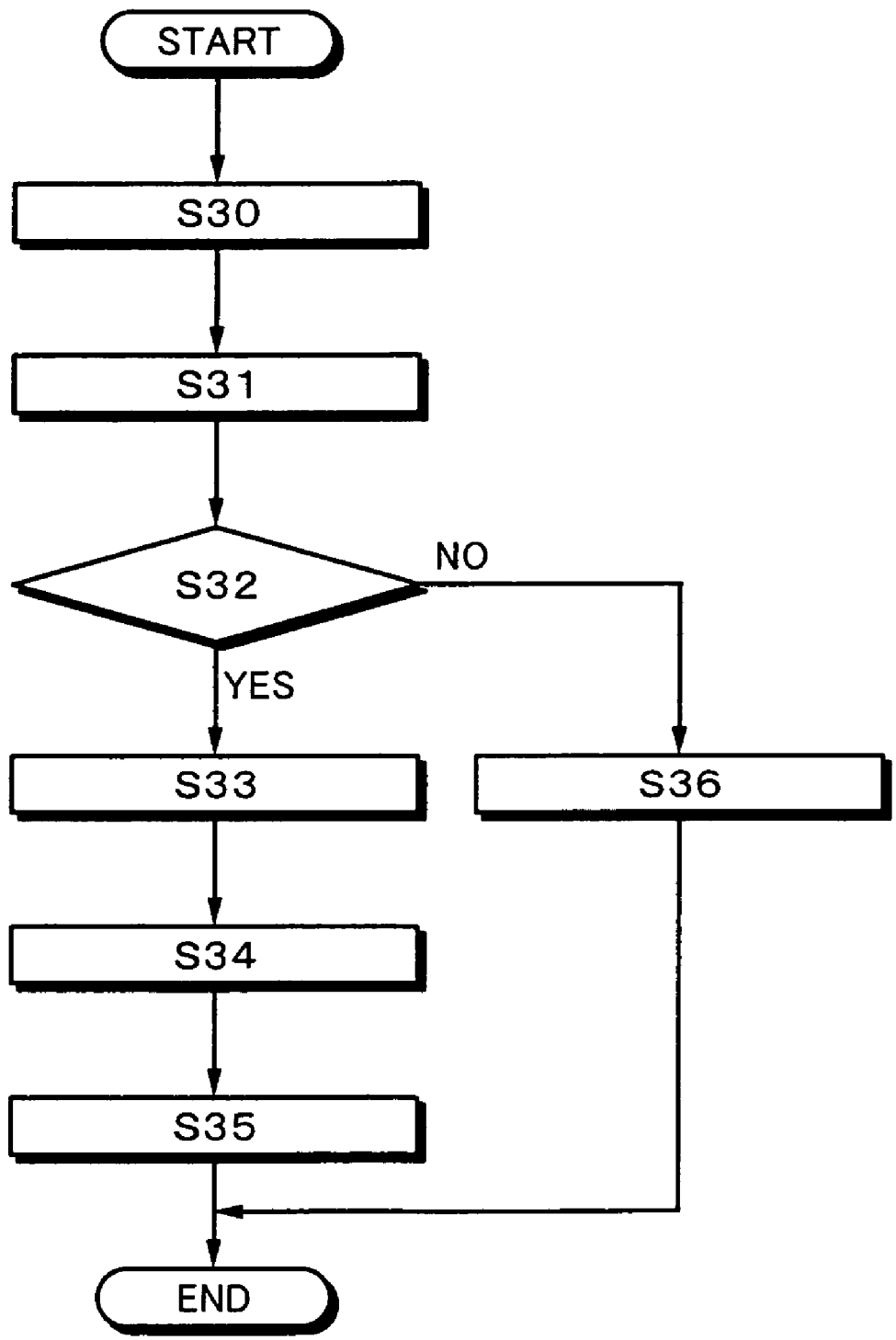
FIG. 18 is a flow chart showing an example of a process of which a reproduction side implements a program using event listener registration.

FIG. 18 shows an example of a process that implements an operation of the programming shown in FIG. 17 to the reproduction side. Object BDBasicPlayer starts the reproduction of a play list (at step S30). It is assumed that while a play list was being reproduced, object BDBasicPlayer detected a mark in the play list (at step S31). Object BDBasicPlayer checks whether or not an event listener corresponding to the detected mark has been registered (at step S32). In other words, at step S32, it is determined whether or not the process at step S10 described in FIG. 15 has been performed. If the determined result represents that the corresponding event listener has not been registered, the flow advances to step S36. Thus, object BDBasicPlayer does not transmit an event.

On the other hand, when the determined result represents that the event listener corresponding to the mark has been registered, the flow advances to step S33. At step S33, object BDBasicPlayer transmits event MarkEncounteredEvent to an object that has registered the event listener. This process is the same as the process at step S12 shown in FIG. 15. When the object has received event MarkEncounteredEvent, the object executes the method to be executed when event MarkEncounteredEvent takes place (at step S34). In other words, at step S34, method doAction( ) at step S13 shown in FIG. 15 is executed. In this example, method doAction describes a process that cause a button to appear on the screen. The button appears on the screen corresponding to the description (at step S35).

As described in the related art section shown in FIG. 2A and FIG. 2B, in the conventional DVD video, since information of buttons has been multiplexed with an AV stream, when the button appearance start time is changed, it is necessary to re-multiplex the AV stream.

Figure 19A:
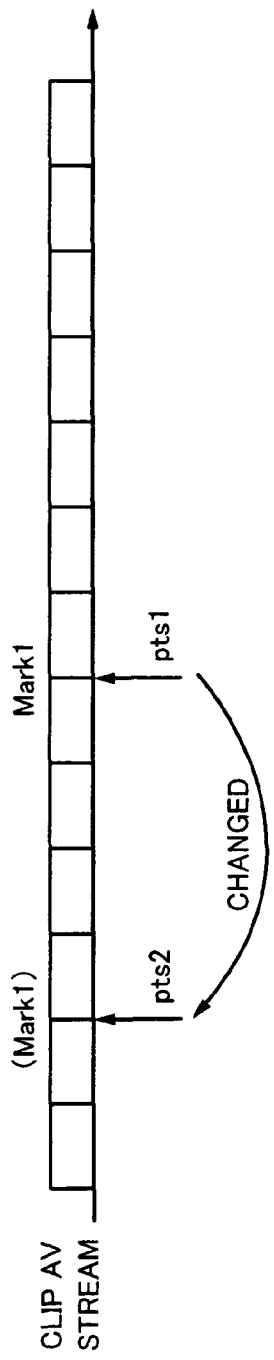
FIG. 19A, FIG. 19B, and FIG. 19C are schematic diagrams showing a clip AV stream file, a file that stores mark data, and a file that stores data of a button, respectively.
Figure 19B:
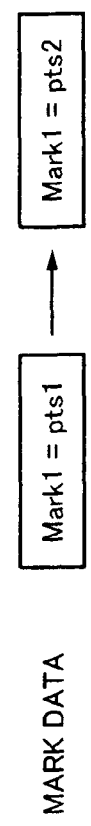
Figure 19C:
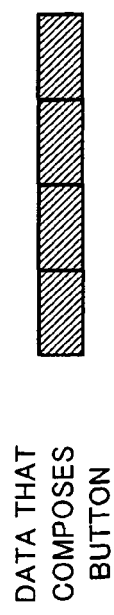

In contrast, in the BD-ROM virtual player model according to the first embodiment of the present invention, by changing only the set position of a mark on the time axis, the button appearance start time can be changed. According to the first embodiment of the present invention, as shown in FIG. 19A, FIG. 19B, and FIG. 19C, a clip AV stream file (FIG. 19A), a mark data file (FIG. 19B), and a button data file (FIG. 19C) are independently structured (the file structure will be described later). The clip AV stream file is a file of which a video pack and an audio pack are multiplexed.

In such a manner, information of a mark is stored in a database file that is different from a file of the clip AV stream. Thus, as shown in FIG. 19A, FIG. 19B, and FIG. 19C, when the appearance start time of a button image is changed from time pts1 to time pts2, it is necessary only to change time pts1 of the mark information to time pts2. Thus, even if the position of a mark is changed, it is not necessary to re-multiplex the clip AV stream.

In addition, according to the first embodiment, data that compose a button is stored in a file that different from a file of the clip AV stream. Thus, as a process executed when a button is selected, only the method of the button object independent from the clip AV stream file needs to be changed. As described above, in the conventional DVD video, since a button command that performs a process to be executed when the button is selected is multiplexed with an AV stream, the process executed when the button is selected cannot be easily accomplished.

In the full profile of the BD-ROM, the foregoing BD-ROM virtual player model can provide more flexibly and easier authorization than the conventional DVD video.

In the foregoing embodiment, the BD-ROM virtual player model is structured on the basis of an object oriented event listener model. Alternatively, a BD-ROM virtual player model may be structured with a simpler event driven model than that example.

Figure 20:
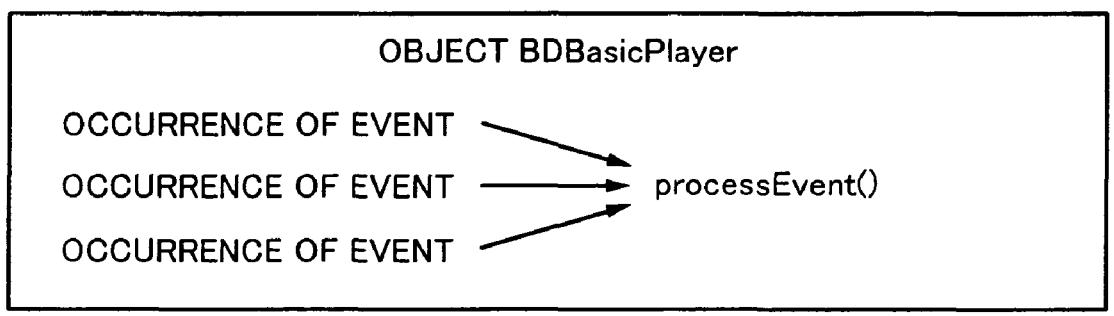
FIG. 20 is a schematic diagram describing a BD-ROM virtual player model based on an event driven model.

Next, with reference to FIG. 20, a BD-ROM virtual player model based on an event driven model will be described. Events that take place in object BDBasicPlayer are the same as those in an object oriented model shown in FIG. 15. In the case of this event driven model, it is assumed that when an event takes place, only method processEvent( ) defined in object BDBasicPlayer is called. In other words, in the model, no matter what event takes place, the same method is called. Thus, to change a process corresponding to the type of an event that takes place, it is necessary to determine what event took place in method processEvent( ).

In this model, it is not necessary to register an event listener corresponding to each event. However, whenever an event takes place, since method processEvent( ) is called, the efficiency of this model is low. In addition, since method processEvent( ) to be processed is fixedly defined in object BDBasicPlayer, this model does not have expansibility that allows a new process routine to be defined in another object and executed. Thus, according to the first embodiment of the present invention, which emphasizes high expansibility, it is preferred to structure the BD-ROM virtual player model with an object oriented model described in FIG. 15.

1-4. About User Inputs

FIG. 21A, FIG. 21B, FIG. 21C, and FIG. 21D show a list of examples of definitions of user input commands that the BD-ROM virtual player model can receive. The user inputs are supposed to be inputs of keys of the remote control commander with which the user operates the player and inputs corresponding to the menu screen of the player. In the BD-ROM virtual player model, the user inputs are one type of key input events.

Command timeSearch(playlistNumber, Time) causes a scenario that is being reproduced to be reproduced from time designated by "Time." Command play(playlistNumber, chapterNumber) causes a designated scenario to be reproduced from a chapter designated by "chapterNumber." Command stop( ) causes the reproduction to be stopped. Command prev( ) causes the reproduction to be started from the beginning of the previous chapter of a chapter that is being reproduced. Command top( ) causes the reproduction to be started from the beginning of a chapter that is being reproduced. Command next( ) causes the reproduction to be started from the beginning of the next chapter of a chapter that is being reproduced. Command forwardScan(speed) causes the reproduction to be performed in the forward direction at a speed designated by "speed." Command backwardScan (speed) causes the reproduction to be performed in the backward direction at a speed designated by "speed." "speed" can be designated in the range from 0.1 to 360.

Command moveCursor(direction, [level]) causes the cursor to be moved in the upper, lower, left, and right directions. "direction" is any one of "upper," "lower," "left," and "right" that cause the cursor to be moved in the upper, lower, left, and right directions, respectively. "level" can be designated with a value in the range from "0" to "255." "level" is optional and normally not used or "0." When "level" is an intermediate value ("1" to "255"), an analog joy stick can be represented.

Command click(buttonNumber) causes a button on the screen to be clicked. Command focus(buttonNumber) causes a button on the screen to be focused.

Command stillOff( ) causes the reproduction stilled by the player to be resumed. Command stillOff( ) can be integrated with command pauseOff. Command pauseOn( ) causes the reproduction to be paused. Command pauseOn( ) can be operated only when a scenario is reproduced. Command pauseOff causes the paused reproduction to be released.

Command LanguageSelect(languageCode) designates the display language of the menu. Command StreamChange (StreamNumber) causes a stream that is being reproduced to be changed. Command setEnabled (Boolean) causes a stream to be displayed/not displayed. Command angleChange (angleNumber) causes a display angle to be changed. Command parentalCountrySelect (countryCode) causes a country code for a parental level to be set. Command videoPresentationModeChange (mode) designates a video display format. "mode" is any one of "Wide," "LB (Letter Box)," and "Pan-Scan."

FIG. 22 shows an example of class RmtKeyEvent that represents a key input event that takes place in the remote control commander. Parameter "source" is an object of a source of an event. Thus, "source" represents object BDBasicPlayer. Parameter "id" is an integer that represents the type of an event. Parameter "when" is an integer in the long format that represents time at which an event takes place. Parameter "mtKeyCode" is an integer type code corresponding to an input virtual key or "VK_UNDEFINED." "VK_UNDEFINED" will be described later.

As described in FIG. 3A and FIG. 3B, user inputs by keys of the remote control commander are received by the hardware and transferred to object BDBasicPlayer. Object BDBasicPlayer generates object RmtKeyEvent corresponding to the user input and class. RmtKeyEvent. An object that has registered an event listener corresponding to object RmtKeyEvent is informed of a command corresponding to a user input.

FIG. 23 shows a list of examples of methods of object RmtKeyEvent. Method getRmtKeyCode returns a key code corresponding to a key that caused an event to take place. Method setRmtKeyCode sets a key code of a key that cause an event to take place. When method getRmtKeyCode is executed, it can be determined by what key object RmtKeyEvent took place.

FIG. 24, FIG. 25A, and FIG. 25B show lists of examples of keys obtained by method getRmtKeyCode described in FIG. 23. Keys starting with "VK" shown in FIG. 25A and FIG. 25B are virtual keys on object BDBasicPalyer. Key VK_POWER provides a function corresponding to power key. Key VK_POWER_ON provides a function corresponding to power ON key. Key VK_POWER_OFF provides a function corresponding to power OFF key. Key VK_MENU provides a function corresponding to menu key that causes a menu to appear. Key VK_ENTER provides a function corresponding to enter key that causes data to be entered. Key VK_RETURN provides a function corresponding to return key that causes the step of a process to be returned by one.

Key VK_PLAY provides a function corresponding to play key that causes the reproduction to be performed. Key VK_STOP provides a function corresponding to stop key that causes the reproduction to be stopped. Key VK_PAUSE provides a function corresponding to pause key that causes the reproduction to be paused. Key VK_FAST_FORWARD provides a function corresponding to fast forward key that causes the fast forward reproduction to be performed. Key VK_FAST_REVERSE provides a function corresponding to fast reverse key that causes the fast reverse reproduction to be performed. Key VK_SLOW_FORWARD provides a function corresponding to slow (forward) key that causes the slow forward reproduction to be performed. Key VK_SLOW_REVERSE provides a function corresponding to slow (reverse) key that causes the slow reverse reproduction to be performed. Key VK_STEP_FORWARD provides a function corresponding to step (forward) key that causes the forward step reproduction to be performed. Key VK_STEP_REVERSE provides a function corresponding to step (reverse) key that causes the reverse step reproduction to be performed.

Key VK_NEXT provides a function corresponding to next key that causes a value corresponding to "next" to be input. Key VK_PREVIOUS provides a function corresponding to previous key that causes a value corresponding to "previous" to be input. With Key VK_NEXT and Key VK_PREVIOUS, the current chapter is caused to be jumped to the next and previous chapters, respectively.

Key VK_UP provides a function corresponding to up key that causes a value of "up" to be input. Key VK_DOWN provides a function corresponding to down key that causes a value of "down" to be input. Key VK_RIGHT provides a function corresponding to right key that causes a value of "right" to be input. Key VK_LEFT provides a function corresponding to left key that causes a value of "left" to be input. Key VK_UP_RIGHT provides a function corresponding to upper right key that causes a value of "upper right" to be input. Key VK_UP_LEFT provides a function corresponding to upper left key that causes a value of "upper left" to be input. Key VK_DOWN_RIGHT provides a function corresponding to lower right key that causes a value of "lower right" to be input. Key VK_DOWN_LEFT provides a function corresponding to lower left key that causes a value of "lower left" to be input. These directional keys cause the cursor to be moved on the screen.

Key VK_ANGLE provides a function corresponding to angle selection key that causes the angle of a multi-angle video content to be changed. Key VK_PRESENTATION_GRAPHICS provides a function corresponding to sub title selection key that selects English/Japanese sub title, sub title display/non-display mode, and so forth. Key VK_AUDIO provides a function corresponding to audio selection key that selects an audio mode such as a surround mode or a bilingual mode. Key VK_VIDEO_ASPECT provides a function corresponding to aspect ratio selection key that selects an aspect ratio of a video content. Key VK_COLORED_KEY_1 provides a function corresponding to colored function key 1. Key VK_COLORED_KEY_2 provides a function corresponding to colored function key 2. Key VK_COLORED_KEY_3 provides a function corresponding to colored function key 3. Key VK_COLORED_KEY_4 provides a function corresponding to colored function key 4. Key VK_COLORED_KEY_5 provides a function corresponding to colored function key 5. Key VK_COLORED_KEY_6 provides a function corresponding to colored function key 6. Key VK_UNDEFINED is an undefined key.

The keys listed in FIG. 24, FIG. 25A, and FIG. 25B do not always match keys physically disposed on a real remote control commander. In addition, depending on a type of a remote control commander, a plurality of functions may be assigned to one physical key. Alternatively, the user may select one from images of keys of a remote controller that appears on the screen. Thus, the keys shown in FIG. 24, FIG. 25A, and FIG. 25B are virtual keys that abstractly form corresponding functions. Since user inputs to object BDBasicPlayer are represented with such virtual keys, user inputs that do not depend on the apparatus can be defined.

Figure 26:
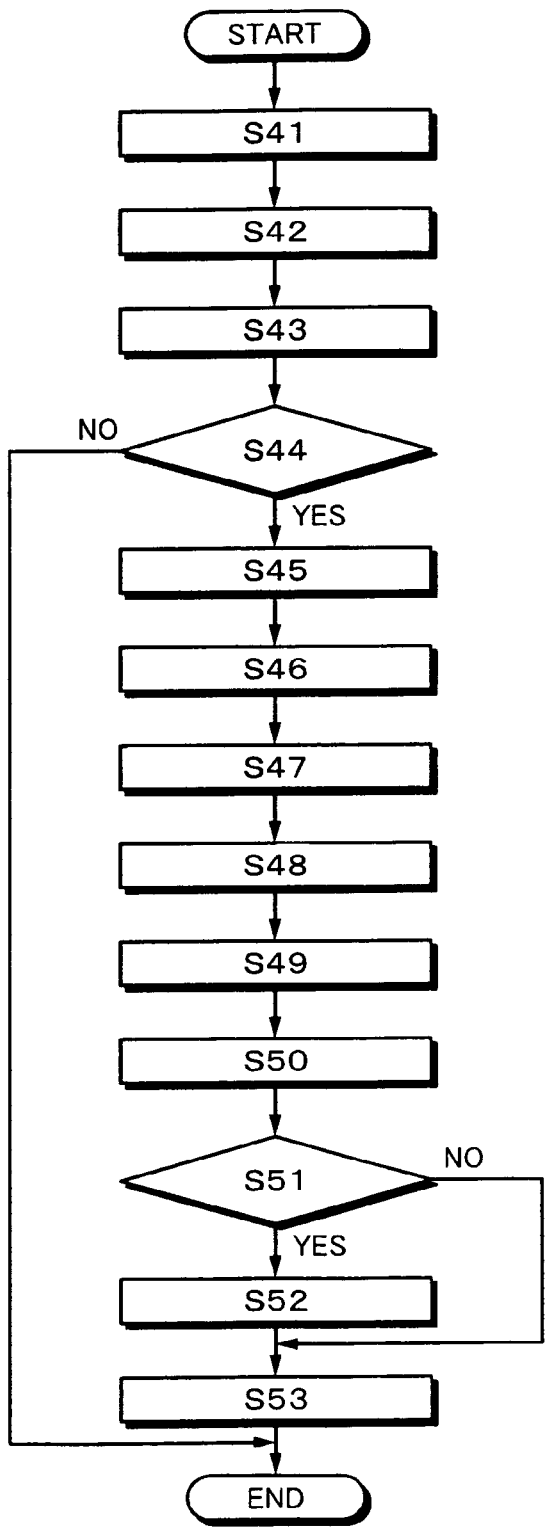
FIG. 26 is a flow chart showing an example of a process that executes a program triggered by an user input event.

FIG. 26 shows an example of a process that executes a provided program when a user input event takes place. In the process shown in FIG. 26, when the user presses "next" key while one chapter is normally being reproduced, the current chapter is jumped to the next chapter, the next chapter reproduced, and a prepared message appears on the screen.

"next" key is a key that causes the current chapter to be jumped to the next chapter and the next chapter to be reproduced. "next" key is for example a key disposed on the remote control commander. The process of the flow chart shown in FIG. 26 is started when the user presses "next" key while the player is reproducing a chapter (at step S41). When "next" key is pressed, object RmekeyEvent takes place (at step S42). The database is searched for a chapter mark of the next chapter (at step S43). Corresponding to the searched result, it is determined whether or not there is the next chapter mark (at step S44). When there is no chapter mark, a series of processes are completed and the regular reproduction is resumed. When the determined result at step S44 represents that there is the next chapter mark, the flow advances to step S45.

At step S45, object BDBasicPlayer causes the reproduction of the current chapter that is being reproduced to be stopped in response to "next" key (at step S45). When the reproduction of the player is stopped, event PlayStoppedEvent takes place (at step S46). Object BDBasicPlayer obtains the byte position of the next chapter mark in the clip AV stream file from feature point information of the clip information file. The obtained byte position of the file is accessed and the stream is read and reproduced from the byte position (at step S47).

After step S48, a series of processes that cause a message to appear on the screen are performed so as to inform the user that the current chapter was changed. To cause a message to appear at a position the current chapter was changed, a method that causes the player to display a message needs to be implemented as an event listener corresponding to event MarkEncounteredEvent. When the reproduction of the stream is started, event PlayStartedEvent takes place. In addition, event MarkEncountedEvent takes place corresponding to the chapter mark (at step S48).

When event MarkEncounterEvent takes place, at step S49, the execution of a listener corresponding to event MarkEncounteredEvent is started. In the listener, the type of the mark detected by event MarkEncounteredEvent is obtained (at step S50). It is determined whether or not the mark is a chapter mark (at step S51). When the determined result represents that the mark is not a chapter mark, the flow advances to step S53. At step S53, the execution of the listener is completed. When the determined result represents that the detected mark is a chapter mark, the flow advances to step S52. At step S52, a message that represents the beginning of a chapter appears.

In this example, when the user presses a key of the remote control commander, event RmtKeyEvent takes place. When event RmtKeyEvent takes place, a plurality of status changes take place. As a result, a plurality of events, PlayStoppedEvent, PlayStartedEvent, and MarkEncounteredEvent take place.

Thus, in the BD-ROM virtual player model according to the first embodiment of the present invention, a user input event causes the status of the player to change and a new event to take place. With new events, various processes can be performed.

According to the first embodiment of the present invention, by defining a BD-ROM virtual player model, various merits that are not present in the DVD video can be obtained. For example, according to the first embodiment of the present invention, several functions of the conventional DVD video can be accomplished with one model.

As a first example, a forced sub title display function and a UOP (User Operation) prohibition function may be used. The forced sub title display function is a function that causes a predetermined sub title to be forcedly displayed at a predetermined scene even if the user has turned off the sub title display function. The UOP prohibition function is a function that prohibits the user from inputting data. In the DVD video, data structures and operation models for these functions are defined.

In the BD-ROM virtual player model according to the first embodiment of the present invention, with respect to the forced sub title display function, a scene (time) for which a sub title is forcedly displayed is marked. A process that causes a sub title to be forcedly displayed on the screen regardless of whether the sub title display mode has been turned on or off is provided as a listener. Thus, with a model that processes regular marks, the forced sub title display function can be accomplished.

With respect to the UOP prohibition function, unless an even listener for key input events of the remote control commander has been registered, even if a key input event takes place, no process is performed. Thus, the user input is ignored and the UOP is prohibited.

Thus, according to the first embodiment of the present invention, since the functions of the DVD can be accomplished with one event model, the disc creator side can unlaboriously create the DVD.

In addition, in the DVD video, keys of the remote control commander are pre-assigned for operations. When the sub menu key of the remote control commander is pressed, as an operation that has been pre-assigned for the sub menu key, a sub menu screen on which audio mode, sub title mode, and angle can be changed appears. However, since the sub menu is not essential data of the DVD video, a disc that does not have the sub menu exists. In this case, even if the sub menu key is pressed while the player has such a disc, no operation takes place.

On the other hand, in the BD-ROM virtual player model according to the first embodiment of the present invention, as described with reference to FIG. 21A, FIG. 21B, FIG. 21C, FIG. 21D, FIG. 22, FIG. 23, FIG. 24, FIG. 25A, and FIG. 25B, the relationships of keys and processes performed corresponding thereto can be designated by the disc creator side. Thus, with a program that causes the player to a message to appear in the case that the disc does not have the sub menu, when the user presses the sub menu key, he or she can be informed of a message representing that the disc does not have the sub menu.

Thus, according to the first embodiment of the present invention, since the disc creator side has a higher degree of freedom to create a disc, the disc creator side can create a disc that the user can easily handle.

In addition, according to the first embodiment of the present invention, a Java class is defined corresponding to the BD-ROM virtual player model and the reproduction of a play list is controlled with a Java program. With the Java program, a multi-thread program can be accomplished. As a result, time lags due to a network access and waiting time in response to a user input can be easily handled. In addition, with the Java program, a branch prediction, a speculative execution, and so forth can be easily accomplished by pre-reading commands. Thus, processes can be performed at high speed.

1-5. About File Management Structure

Figure 27:
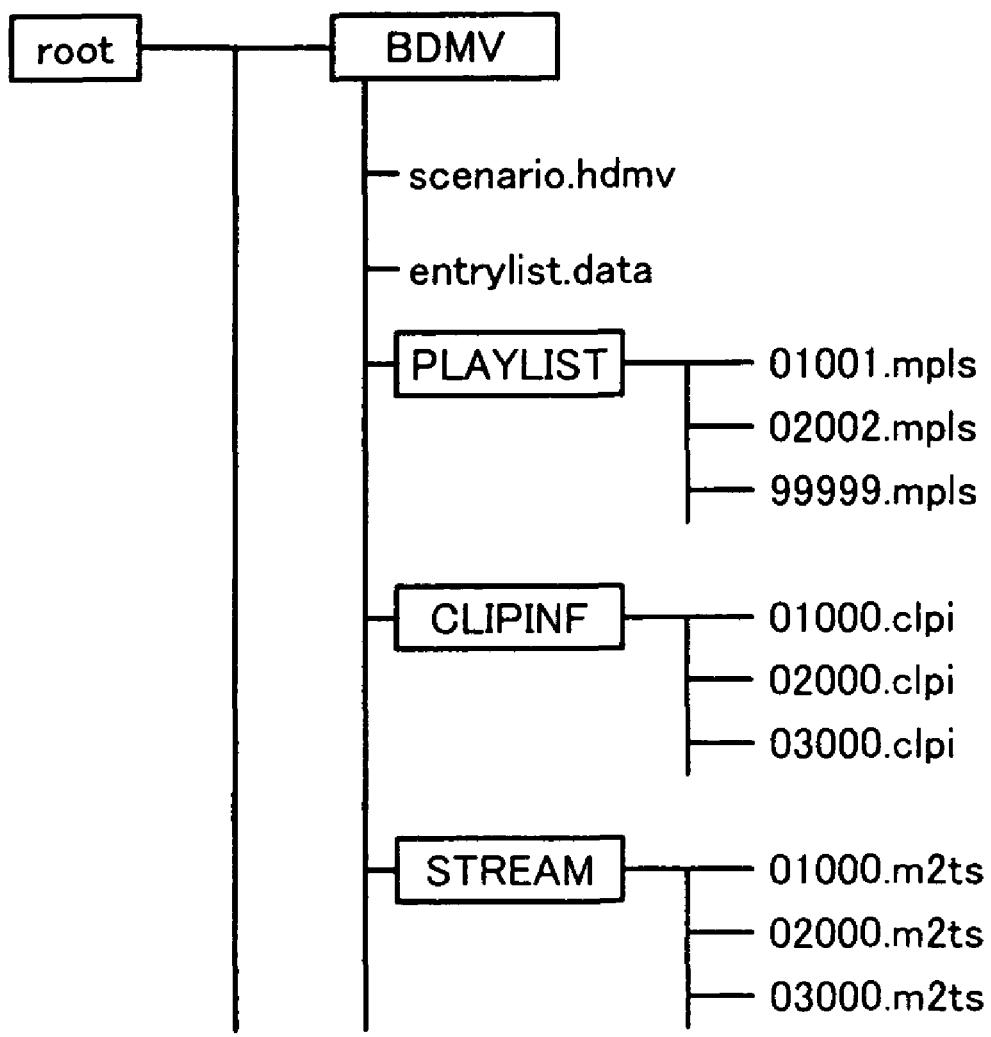
FIG. 27 is a schematic diagram showing an example of a file management structure applicable to a full profile of the BD-ROM.

Next, with reference to FIG. 27, a file management structure applicable to a full profile of the BD-ROM will be described. Files are hierarchically managed. One directory (a root directory in the example shown in FIG. 27) is formed on a recording medium. Files below this directory are managed by one recording and reproducing system.

Below the root directory, directory BDMV is placed. A plurality of directories BDMV may be placed below the root directory.

Below directory BDMV, two files "scenario.hdmv" and "entrylist.data" are placed. Below directory BDMV, a plurality of directories "PLAYLIST," "CLIPINF," and "STREAM" are placed.

File "scenario.hdmv" is a scenario file that stores a scenario. A scenario has a structure of which a plurality of play lists are arranged. For example, a scenario controls the reproduction order of play lists. To allow the user to see a scenario in its divided units, chapters may be provided. Movie objects in the HD movie mode of the BD-ROM are stored in file "scenario.hdmv."

File "entrylist.data" stores information about a menu such as search points (title entries) of a scenario, play lists that compose a menu, and entry points to a play list group. An index table in the HD movie mode of the BD-ROM is stored in file "entrylist.data."

Directory "PLAYLIST" stores play lists. One play list is stored in one file "**.mpls." Information that represents the positions of marks in a clip AV stream are stored in play list file "**.mpls" that designates the reproduction rage of the clip AV stream.

Directory "CLIPINF" stores clip information files "#####.clpi." Directory "STREAM" stores clip AV stream files "%%%%%.m2ts." When related file names are assigned to clip AV stream files, they can be easily correlated. For example, the same file names "#####" and "%%%%%" except for extensions are used for clip information files and clip AV stream files.

A Java class file that composes a Java program is stored in a predetermined directory (not shown) placed below the directory BDMV. Alternatively, the Java class file may be placed in a directory in the same hierarchical level as the directory BDMV.

1-6. About Decoder Model

Figures 28, 28A:
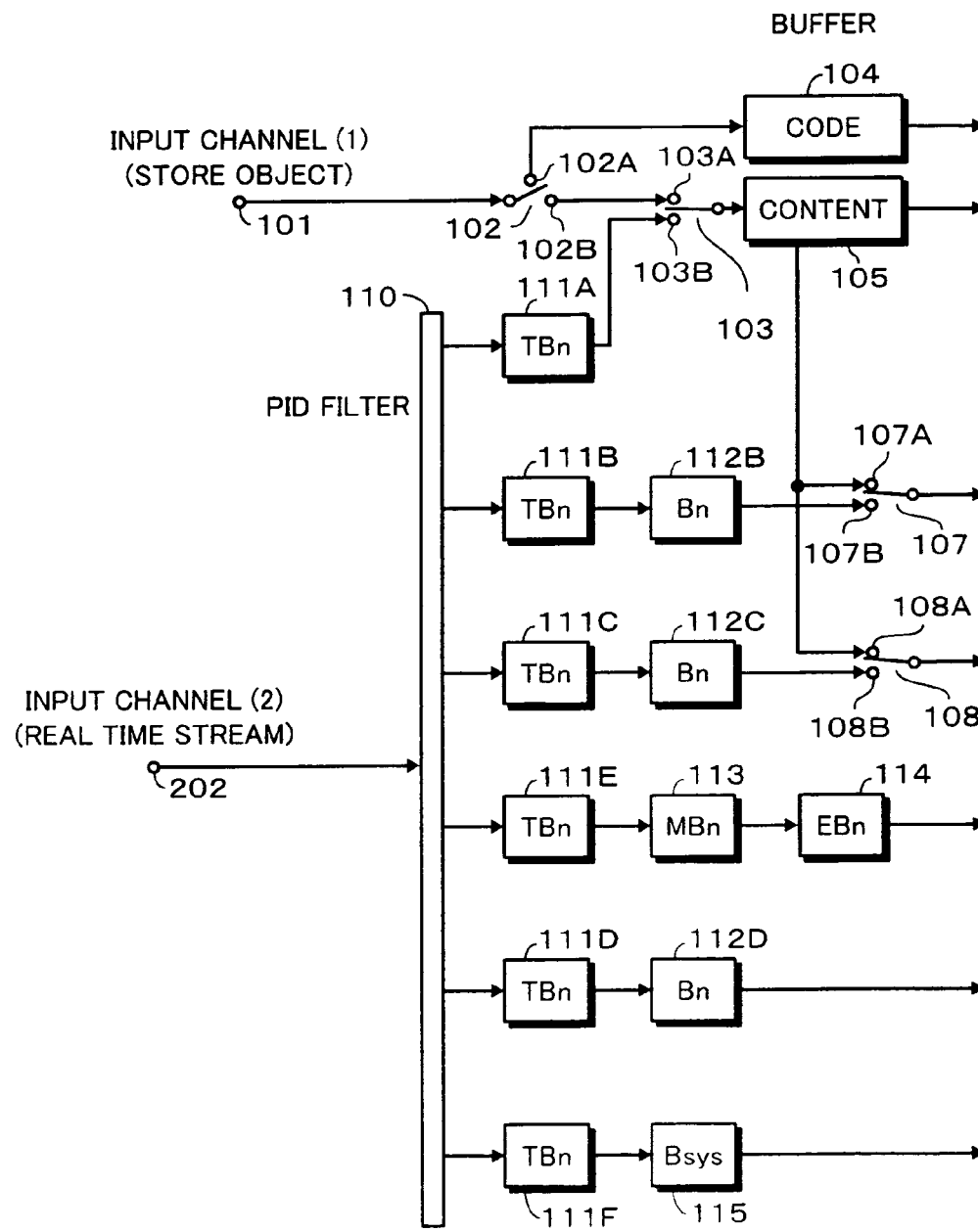
FIG. 28A, FIG. 28B, and FIG. 28C are functional block diagrams showing an example of a structure of a player decoder 100 according to a first embodiment of the present invention.
Figure 28B:
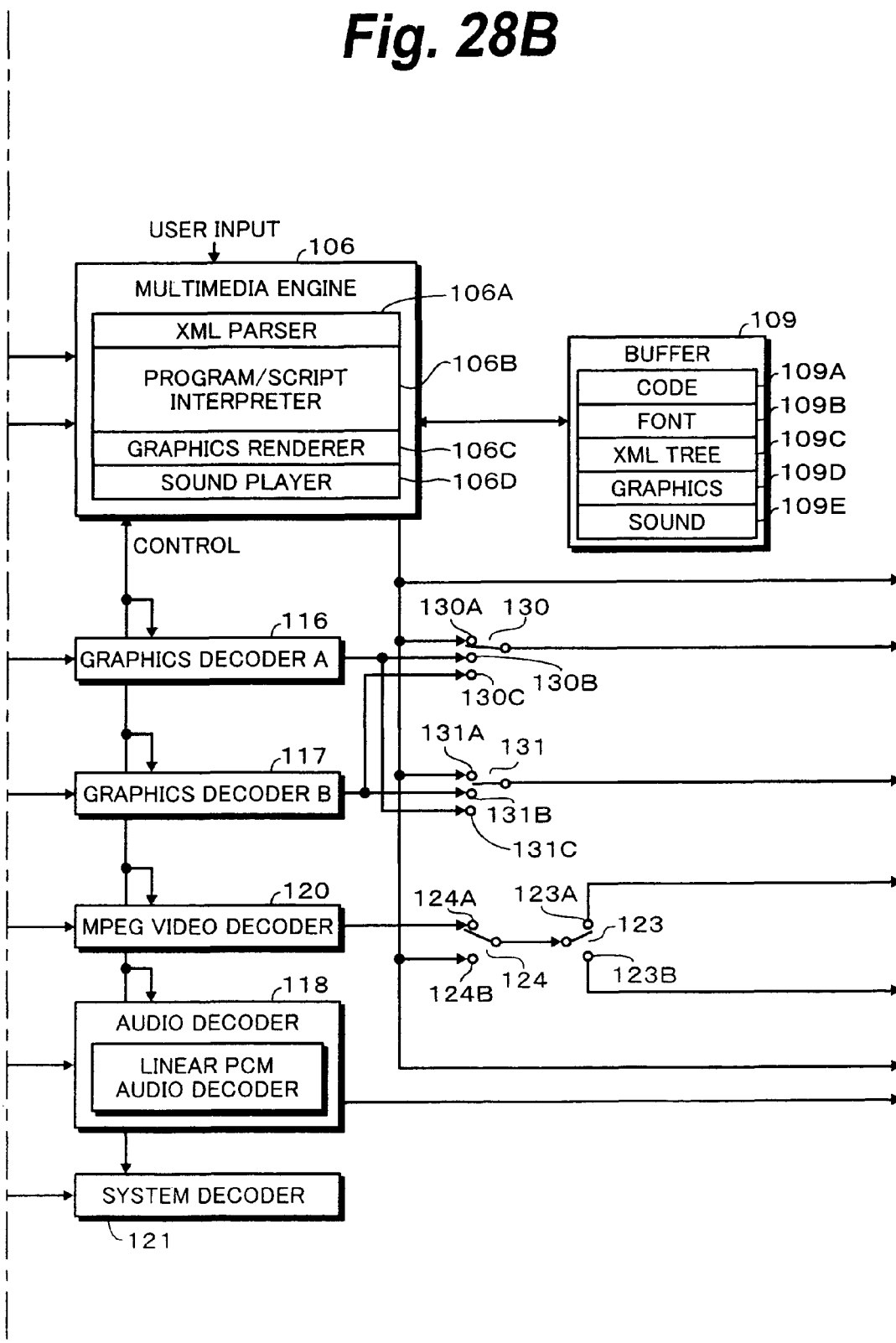
Figure 28C:
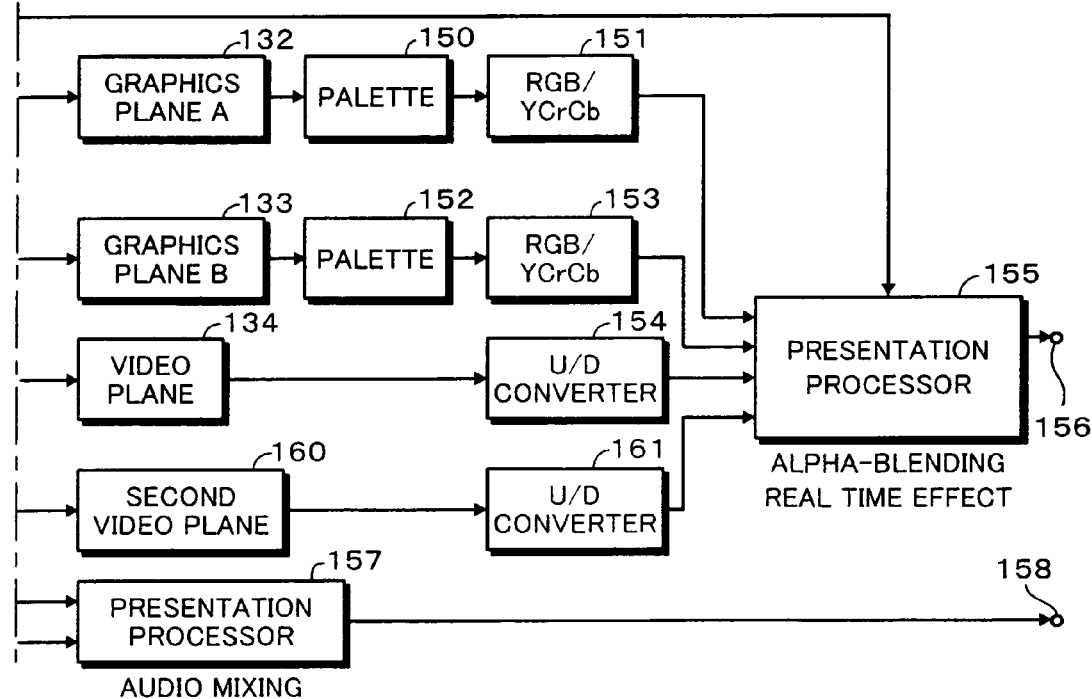

Next, a player decoder 100 according to the first embodiment of the present invention will be described. FIG. 28A, FIG. 28B, and FIG. 28C are a functional block diagram showing an example of a structure of a player decoder 100 according to the first embodiment of the present invention. The player decoder 100 interprets data reproduced from a disc loaded into a drive device (not shown), outputs an AV (Audio/Video) stream that composes a content, and allows the user to interactively operate the output AV stream.

All operations of the player decoder 100 are controlled by a CPU (not shown). Streams and data flows of individual portions of the player decoder 100 are monitored and controlled by the CPU.

When the disc is loaded into the drive device (not shown), file "scenario.hdmv" that describes the reproduction order of play lists and file "entrylist.data" that describes the top play list of the play list group that compose a menu and a title are reproduced. In accordance with the descriptions of file "scenario.hdmv" and file "entrylist.data", other necessary files are read from the disc and thereby a content recorded on the disc is reproduced.

For example, in accordance with the descriptions of file "scenario.hdmv" and file "entrylist.data", moving picture data displayed on a video plane 134 and a second video plane 160, image data displayed on a graphics plane A 132, a graphic plane B 133, and a second video plane 160, a play list file, and so forth are read from the disc. In the full profile, a file that stores a program is read and executed.

In the following description, among those data that are read from the disc, streams such as moving picture data, sub pictures (sub title data), and sound data that should be continuously processed are referred to as real time streams. In contrast, non-real time data such as scenario files, play list files, program files, part of moving pictures, still pictures, and sound data that do not need to be continuously processed are referred to as store objects. The store objects are stored in a memory or the like and expanded thereon. Store objects stored in the memory are processed when necessary.

The player decoder 100 has two systems of input channels that are channel (1) and channel (2). A store object is input to an input terminal 101 of the input channel (1). A real time stream is input to an input terminal 202 of the input channel (2). Alternatively, a store object may be input to the input terminal 202. According to the first and second embodiments of the present invention, a real time stream and part of store objects that are input to the input terminal 202 are for example MPEG 2 TSs (Moving Pictures Experts Group 2 Transport Streams).

A real time stream that is input to the input terminal 202 is not limited to an MPEG 2 TS. As long as a real time stream can be transmitted in the unit of a packet and multiplexed with video data, audio data, still picture data, or the like, a stream that has another format can be input. At this point, a PID filter 110 that will be described later is used as a demultiplexer that demultiplexes video data, audio data, still picture data, or the like.

When the rotation speed of the disc in the drive device is increased for example twice and the read transfer rate of the disc is increased, the reading operations for the two systems of the channels (1) and (2) from the disc can be performed in time division basis.

Next, the system of the input channel (1) will be described. A store object that is input to the input terminal 101 is input to a switch circuit 102. When a program code of a Java file, an ECMA (European Computer Manufacturers Association) script, an HTML (Hyper Text Markup Language) file (or an XHTML file), or the like as a store object is input, the switch circuit 102 selects an output terminal 102A. The input program code is stored in a code buffer 104.

On the other hand, when image data as a store object are input, the switch circuit 102 selects an output terminal 102B. As a result, the input image data are input to a switch circuit 103. When a real time stream that is input to the input terminal 202 does not contain image data displayed on the graphics plane A 132 and the graphics plane B 133, the switch circuit 103 selects an input terminal 103A. The image data that are input from the switch circuit 102 is stored in a contents buffer 105.

Likewise, when image data displayed on the graphics plane A 132 and the graphics plane B 133 are contained in a real time stream that is input to the input terminal 202, the switch circuit 103 selects an input terminal 103B. As a result, the image data are stored in the contents buffer 105. Store objects stored in the code buffer 104 and the contents buffer 105 are read when necessary and supplied to a multimedia engine 106.

The image data of the store object stored in the contents buffer 105 are also supplied to a graphics decoder A 116 and a graphics decoder B 117 through switch circuits 107 and 108, respectively.

The multimedia engine 106 includes an XML parser 106A, a program/script interpreter 106B, and a graphics renderer 106C. The multimedia engine 106 also includes a sound player 106D that can handle audio data. The multimedia engine 106 may be composed of independent hardware. Alternatively, the multimedia engine 106 may be accomplished by a process of a predetermined program that the foregoing CPU (not shown) executes.

The XML parser 106A has a function for parsing an XML (Extensible Markup Language) document. In addition, the XML parser 106A can also parse an HTML document and an XHTML document. An HTML document and an XHTML document parsed by the XML parser 106A are converted into respective formats that can be executed by the player decoder 160. The program/script interpreter 106B analyzes a Java (registered trademark) program, an ECMA script, and so forth and converts them into respective formats that can be executed by the player decoder 100. The graphics renderer 106C decodes image data and obtains a format that can be expanded on the sub title plane 11 and the graphics plane 12.

The multimedia engine 106 performs processes for the XML parser 106A, the program/script interpreter 106B, and the graphics renderer 106C with a work memory of a buffer 109. For example, the XML parser 106A and the program/script interpreter 106B use a code buffer 109a of the buffer 109. The graphics renderer 106C uses a graphics buffer 109D of the buffer 109. The buffer 109 also includes a font buffer 109B that stores font data used to display a character string, a tree buffer 109C that stores the parsed result of the HTML document by the XML parser 106A in a hierarchical tree structure, a sound buffer 109E that stores audio data used in the sound player 106D, and so forth.

When necessary, the multimedia engine 106 reads a Java program from the code buffer 104, image data from the contents buffer 105, and so forth. Data that are stored in the code buffer 104 and the contents buffer 105 can be stored in the code buffer 104 and the contents buffer 105 until the data become unnecessary. Thus, data stored in the code buffer 104 and the contents buffer 105 can be repeatedly read and used when necessary.

Beside the foregoing data, the multimedia engine 106 reads for example an ECMA script stored in the code buffer 104 and executes it. When necessary, the multimedia engine 106 can read another ECMA script and an HTML document (or XHTML document) from the code buffer 104 and execute them in accordance with the description of the ECMA script that has been read.

In addition, the multimedia engine 106 receives a user input from a remote control commander, a pointing device, or the like and performs a predetermined process for the user input. The user input is supplied to the graphics decoder A 116, the graphics decoder B 117, an audio decoder 118, an MPEG video decoder 120, and a system decoder 121 that will be described later.

Image data processed by the graphics renderer 106C are supplied to the graphics plane A 132 and the graphics plane B 133 through switch circuits 130 and 131, respectively. In this example, although image data supplied to the graphics plane A 132 and the graphics plane B 133 may have several formats for example the PNG format, the run length format, and the JPEG format, according to the present invention, the formats thereof are not limited. Timing at which the image data are supplied to the planes 132 and 133 is controlled by the multimedia engine 106.

In addition, the multimedia engine 106 supplies control signals to a presentation processor 155 that will be described later to cause it to select one of the video 134, the sub title plane 134, the second video plane 160, the graphics plane A 132, and the graphics plane B 133 and perform alpha-blending and so forth. Likewise, the multimedia engine 106 supplies a control signal to a presentation processor 157 that will be described later to cause it to control an output of an audio stream.

The multimedia engine 106 reads a Java program from a ROM (not shown) or the like and generates object BDBasicPlayer on the multimedia engine 106. The multimedia engine 106 reads a Java program from the code buffer 104. When necessary, an object composed of a Java program that has been read from the code buffer 104 registers an event listener to object BDBasicPlayer.

As described in FIG. 15, on the multimedia engine 106, object BDBasicPlayer transmits an event to an object composed of a Java program that has been read from the code buffer 104 corresponding to for example a user input. The object executes the corresponding method. Object BDBasicPlayer detects a status change of the player decoder 100. When object BDBasicPlayer has detected a predetermined status change, the object generates a corresponding event. The multimedia engine 106 causes a method corresponding to the event to control a drive device (not shown) and each portion of the player decoder 100 so as to perform a reproduction control for the disc.

Next, the system of the input channel (2) will be described. A real time stream that is input as an MPEG 2 TS to the input terminal 202 is supplied to the PID filter 110. The PID filter 110 extracts a PID (Packet Identification) from a transport packet of the MPEG 2 TS transport stream and detects an attribute of the stream from the transport packet. The PID filter 110 separates the input real time stream into corresponding systems for each transport packet in accordance with the attribute of the stream.

When a transport packet is a packet in which image data of a store object is contained, the transport packet is temporarily stored in a buffer TBn 111A. The transport packet is read at predetermined timing and input to the switch circuit 103 through the input terminal 103B that has been selected. Thereafter, the transport packet is stored in the contents buffer 105 through the switch circuit 103.

When the PID filter 110 has determined that the transport packet contains sub title data in accordance with the PID, the transport packet is temporarily stored in a buffer TBn 111B and a buffer Bn 112B. The transport packet is read at predetermined timing and input to the switch circuit 107 through an input terminal 107B that has been selected. The transport packet is supplied to the graphics decoder A 116 through the switch circuit 107.

The graphics decoder A 116 removes header information from the supplied transport packet, decodes sub title data contained in the transport packet, and obtains image data for sub titles or the like. The image data are input to an input terminal 130B of the switch circuit 130 and expanded to the graphics plane A 132 through the switch circuit 130. In addition, the image data may be expanded to the graphics plane B 133 through the switch circuit 131.

When the PID filter 110 has determined that the transport packet contains graphics data in accordance with the PID, the transport packet is temporarily stored in a buffer TBn 111C and a buffer Bn112C. The transport packet is read at predetermined timing and input to the switch circuit 108 through an input terminal 108B that has been selected. The transport packet is supplied to the graphics decoder B 117 through the switch circuit 108.

The graphics decoder B 117 removes header information from the supplied transport packet, decodes graphics data contained in the transport packet, and obtains graphics data. The image data are input to an input terminal 131B of the switch circuit 131 at predetermined timing and expanded to the graphics plane B 133 through the switch circuit 131. In addition, the image data may be expanded to the graphics plane A 132 through the switch circuit 131.

The function of the graphics decoder A 116 is not largely different from the function of the graphics decoder B 117. In other words, as a model, there are two systems of graphics decoders that independently operate. Thus, it is considered that sub title data and graphics data can be independently decoded. In a real implementation, a high speed graphics decoder would be used on time division basis as if two virtual systems of graphics decoders existed.

When the PID filter 110 has determined that the transport packet contains audio data in accordance with the PID, the transport packet is temporarily stored in a buffer TBn 111D and a buffer Bn 112D. The transport packet is read at predetermined timing and supplied to the audio decoder 118. Audio data contained in the transport packet is compression-encoded in accordance with a system based on for example the MPEG.

The audio decoder 118 also has for example a linear PCM (Pulse Code Modulation) audio decoder 119. The audio decoder 118 removes header information from the input transport stream, decodes compression-encoded audio data contained in the transport packet, and obtains linear PCM audio data.

The linear PCM audio data that are output from the audio decoder 118 are input to the presentation processor 157 for audio. The presentation processor 157 adds a predetermined effect sound and so forth to the linear PCM audio data under the control of the multimedia engine 106. The resultant data are obtained from an output terminal 158.

When the PID filter 110 has determined that the transport packet contains moving picture data in accordance with the PID, the transport packet is temporarily stored in a buffer TBn 111E, a buffer MBn 113, and a buffer EBn 114, read at predetermined timing, and supplied to the MPEG video decoder 120. The moving picture data contained in the transport packet has been compression-encoded in accordance with the MPEG 2 system.

The MPEG video decoder 120 removes header information from the supplied transport packet, decodes moving picture data that has been compression-encoded in accordance with the MPEG 2 system, and obtains base band moving picture data.

The moving picture data that are output from the MPEG video decoder 120 are input to an input terminal 124A of a switch circuit 124. In the switch circuit 124, moving picture data that are output from the MPEG video decoder 120 and moving picture data that are output from the multimedia engine 106 are selected. The moving picture data selected at predetermined timing are input to a switch 123. The switch 123 selects a video plane to which the moving picture data are expanded. The moving picture data are developed to the video plane 134 or the second video plane 160.

When the PID filter 110 has determined that the transport packet contains system information in accordance with the PID, the transport packet is supplied to the system decoder 121 through buffers TBn 111F and Bsys 115. The system decoder 121 removes header information from the supplied transport packet and extracts the system information therefrom. The system information is supplied to for example a CPU (not shown).

Image data on the graphics plane A 132 are supplied to a palette 150. The palette has 256 colors. The palette is referenced with an index. RGB data are output. In addition, intransparency data α1 that is a parameter for alpha-blending is extracted. The RGB data are converted into YCbCr data by an RGB/YCbCr converting circuit 151. The YCbCr data and the intransparency data α1 are supplied to the presentation processor 155.

Image data on the graphics plane 133 are supplied to a palette 152. The palette has 256 colors. The palette is referenced with an index. As a result, RGB data are output. In addition, intransparency data α2 is extracted. The RGB data are converted into YCbCr data by an RGB/YCbCr converting circuit 153. The YCbCr data and the intransparency data α2 are supplied to the presentation processor 155.

An output of the video plane 134 is supplied to the presentation processor 155 through an up/down converter 154. Likewise, an output of the second video plane 160 is supplied to the presentation processor 155 through a up/down converter 161.

The up/down converter 154 is a circuit that converts the resolution of the image. The up/down converter 154 converts for example a HD (High Definition) image having a high resolution into an SD (Standard Definition) image having a standard resolution.

The presentation processor 155 performs an alpha-blending process using intransparency α1 of image data of the graphics plane A 132 and intransparency α2 of the graphics plane B 133. In addition, the presentation processor 155 alternately selects outputs of the video plane 134 and the second video plane 160 for each pixel so as to accomplish the foregoing picture-in-picture function, the wall paper display function, and so forth.

In other words, the presentation processor 155 selects the image data of the video plane 134 and the second video plane 160 with a switch (not shown) so as to generate one piece of image data. The image data and the image data of the graphics plane A 132 are combined in accordance with the intransparency α1 set to the image data of the graphics plane A 132. In addition, the image data of the graphics plane B 133 are combined with the image data of which the video plane and the graphics plan A 132 have been combined in accordance with the intransparency α2 that has been set to the image data of the graphics plane B 133. The image data of the graphics plane B 133, the image data of the graphics plane A 132 (sub title data), and the image data of which the image data of the video plane 134 and the second video plane 160 have been combined are obtained from an output terminal 156.

The presentation processor 155 can perform an effect process for image data in real time.

In the foregoing description, each portion of the player decoder 100 is composed of hardware. However, the present invention is not limited to such an example. For instance, the player decoder 100 can be accomplished by a process of software. In this case, the player decoder 100 can be operated on a computer device. Alternatively, the player decoder 100 may be accomplished by a combination of hardware and software. For example, the audio decoder 118 and the MPEG video decoder 120 may be composed of hardware. The rest of the player decoder 100 may be composed of software.

A program that causes the computer device to execute the player decoder 100 that is composed of only software or a combination of hardware and software is recorded on a recording medium for example a CD-ROM (Compact Disc-Read Only Memory) and supplied therewith. The CD-ROM is loaded into a CD-ROM drive of the computer device. The program recorded on the CD-ROM is installed to the computer device. As a result, the foregoing process can be executed on the computer device. Since the structure of the computer device is well known, the description thereof will be omitted.

2. Second Embodiment of Present Invention

Next, a second embodiment of the present invention will be described. According to the second embodiment, a player model is described with a script language called the ECMA script. The ECMA script is a cross platform script language prescribed by ECMA (European Computer Manufacturers Association). The ECMA script is based on JavaScript (registered trademark). The ECMA script has a close affinity with an HTML document. In addition, the ECMA script is capable of defining original objects. Thus, the ECMA script can be suitably used for a player model according to the present invention.

As described in FIG. 28A, FIG. 28B, and FIG. 28C, since the multimedia engine 106 in the player decoder 100 can analyze and execute the ECMA script, the player decoder 100 can be used in the second embodiment of the present invention.

According to the second embodiment of the present invention, the standard using a script language based on the ECMA script is called the UMD (Universal Media Disc, registered trademark) video standard. The script part of the UMD video standard is called the UMD video script standard.

2-1. About UMD Video Standard

First, for easy understanding, the UMD video standard applicable to the second embodiment of the present invention will be described. FIG. 29 shows a layer structure of the UMD video standard. The layer structure shown in FIG. 29 corresponds to the structure shown in FIG. 1 according to the first embodiment. In the UMD video standard, three layers, a script layer, a play list layer, and a clip layer, are defined. Corresponding to this structure, streams are managed.

In the UMD video standard, video data, audio data, and sub title data that have been digitally encoded are treated as an MPEG 2 (Moving Pictures Experts Group 2) stream of which they have been multiplexed as MPEG 2 elementary streams. An MPEG 2 stream of which the video, audio, and sub title elementary streams have been multiplexed is called a clip AV stream. A clip AV stream is stored in a clip AV stream file. Whenever a clip AV stream file is recorded, a clip information file is also created in the relation of one to one. A set of a clip information file and a corresponding clip AV stream file is called a clip.

A clip is a recording unit of data that are recorded on the disc. The reproduction order of clips is managed in the play list layer that is an upper layer of clips. The play list layer that is a layer that designates the reproduction path of clips, contains one or a plurality of play lists. A play list is composed of a set of play items. A play item contains a set of an in point and an out point that represent the reproduction range of a clip. With play items, clips can be reproduced in any order. Play items can designate the same clip. An in point and an out point of a clip AV stream file are designated with time stamps (times in a clip). A time stamp is converted into a byte position of the clip AV stream file with information of the clip information file.

A play list has a structure for which play items that represent all or part of clips are reproduced in the order. With only a play list, branches of the reproduction order and interactivity with the user cannot be accomplished.

The script layer is a layer that is composed of the UMD video script, which is an extension of the ECMA script as a language. The UMD video script is a ECMA based script that is extended for an original function of the UMD video.

The script layer is an upper layer of the play list layer. The script layer is composed of play list reproduction commands and player set commands. With commands of the script layer, play list reproductions such as a language selection of which a stream corresponding to a desired language is selected from several streams and conditional branches of which play lists to be reproduced are selected corresponding to predetermined conditions can be accomplished. An example of an application that performs a play list reproduction having conditional branches is a multi-story. This script layer provides an interactive function to the user.

2-2. About Player Model Based on UMD Video Standard

Next, a model of a reproducing apparatus (player) that reproduces data on the basis of the UMD video standard, namely the player model, will be described. First, the player reads a script program, a play list, and a clip information file from the disc. Thereafter, the player reads a clip AV stream file from the disc in accordance with the reproduction order described in the script program, the play list, and the clip information file and reproduces video data, audio data, and sub title data from the clip AV file.

In the language specification of the script program, a functional block that reproduces a play list is implemented as an object of the script program. In the UMD video standard, an object that reproduces a play list is referred to as the movie player object. Play list reproduction commands and player set commands are methods of the movie player object. The movie player object is controlled with methods of the script layer. At this point, a function that allows the movie player object to inform the script layer of a status change, a reproduction position, and so forth is required. This means that the movie player object issues an event to the script program. A process corresponding to the event is described as an event handler.

Thus, with a model of which information is transferred from the movie player object to the script program using events and the script program controls the movie player object using methods, the reproduction of a clip AV stream can be controlled by the script program.

Figure 30:
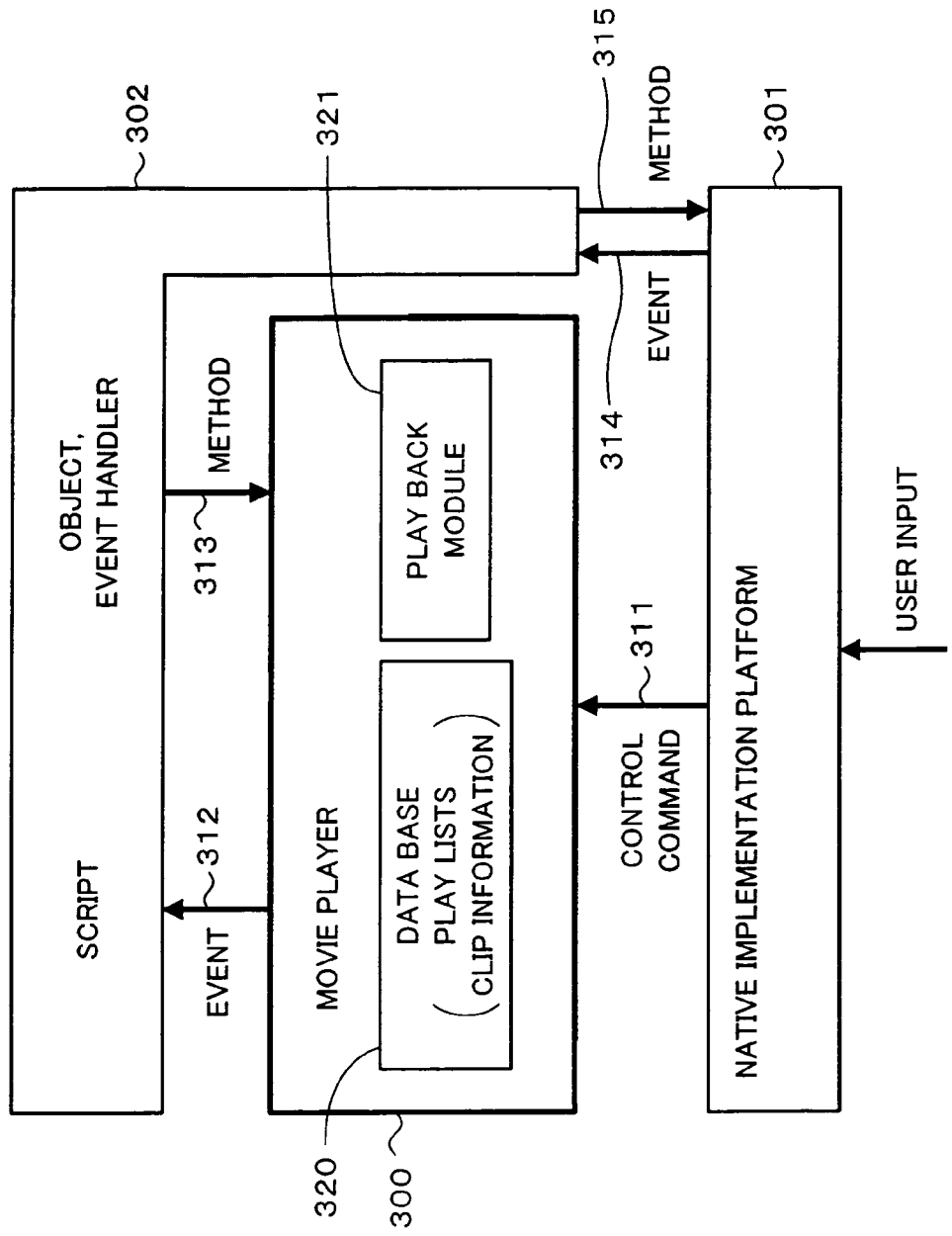
FIG. 30 is a schematic diagram showing an example of a player model according to a second embodiment of the present invention.

FIG. 30 schematically shows an example of the player model according to the second embodiment of the present invention. A movie player 300 is a module that reproduces video data, audio data, and sub title data in accordance with the UMD video standard. The movie player object is an object of a script program so that the script program operates a movie object. In other words, a movie player object is a script program that accomplishes the function of the movie player.

Since it is considered that the movie player 300 and the movie player object represent substantially the same object, hereinafter they are denoted by the same reference numeral.

In FIG. 30, the movie player 300 reads, decodes, and displays a clip AV stream file in accordance with a method of a lower layer (a native implementation platform 301) and a method of the script layer 302 as an upper layer on the basis of a play list and a clip information database.

The interior of the movie player 300 depends on the implementation of a UMD video player that reproduces the UMD video. A script layer 302 provides an API (Application Programming Interface) such as a method and a property as an object that is a black box. In this example, the UMD video player represents a real device that implements a movie player. All UMD video players implement a movie player that complies with the UMD video standard and that has reproduction compatibility.

As shown in FIG. 30, the movie player object 300 has three input/output paths that are a path that receives a control command 311 from the native implementation platform 301, a path that informs the script layer 302 of an event 312, and a path that receives a method 313 from the script layer 302.

The control command 311 is a command that controls the operation of the movie player object 300 received from the native implementation platform 301. The native implementation platform 301 is a portion specific to a device as a real UMD video player and an interface with the movie player 300. The event 312 is a script event that the movie player 300 sends to the script layer 302. The method 313 is a method that the script program of the script layer 302 sends to the movie player 300.

The movie player object 300 has a database 320 for play lists and clip information in accordance with the UMD video standard. The movie player object 300 masks a user input 310 and converts a time designated reproduction position into a byte position of a clip AV stream with the database 320.

A playback module 321 of the movie player 300 decodes a clip AV stream as an MPEG 2 PS (Program Stream) in which video data, audio data, and sub title data have been multiplexed. The playback module 321 has three statuses that are play, stop, and pause. The playback module 321 changes operates in one of these three statuses in accordance with a control command and a method (see FIG. 31).

The script layer 302 is a layer in which a script program is executed on the basis of the UMD video script standard, the movie player object 300 is controlled, and a screen is displayed. The script layer 302 accomplishes a scenario that the content provider side intended to create. The script layer 302 issues the method 313 to the movie player object 300 and receives the event 312 from the movie player object 300. The script layer 302 exchanges with the native implementation platform 301 a key event 314 corresponding to a user input 310 and a method 315 that causes the native implementation platform 301 to display a screen.

For example, buttons that appear on the menu screen are drawn by the native implementation platform 301 corresponding to the method 315 that is transferred from the script program of the script layer 302 to the native implementation platform 301. When the user selects a button on the menu screen, the native implementation platform 301 informs the script layer 302 of the key event 314 corresponding to the user input 310. The script program of the script layer 302 performs a process for the user input 310 corresponding to the key event 314.

The script program and data such as image data and sound data used in the script file are recorded as a file to the disc. This file corresponds to file scenario.hdmv shown in FIG. 25A and FIG. 25B.

Thus, the movie player 300 controls decoding and displaying processes for video data, audio data, and sub title data. On the other hand, the script layer 302 controls allocating and displaying processes for part images such as buttons that compose the GUI (Graphical User Interface) and performs a process against a selecting process for GUI parts.

The native implementation platform 301 is a platform on which the movie player object 300 and a script program operate. When the real UMD video player is composed of hardware, the native implementation platform 301 is specifically implemented as hardware so that the native implementation platform 301 intermediates between the hardware and the player model.

For example, the native implementation platform 301 receives the user input 310 from the user and determines whether the received user input 310 is a command to the movie player 300 or a command to a button that the script layer 302 draws and displays. When the native implementation platform 301 has determined that the user input 310 is a command to the movie player 300, the native implementation platform 301 converts the user input 310 into the control command 311 that is an internal control command of the movie player 300 and issues a control command to the movie player 300. On the other hand, when the native implementation platform 301 has determined that the user input 310 is a command for a GUI part that the script layer 302 draws and displays, the native implementation platform 301 informs the script layer 302 of the key event 314 corresponding to the user input 310.

Next, the movie player 300 will be described in detail. FIG. 31 shows an internal structure of an example of the movie player 300. As described above, the movie player 300 is composed of the database 320 and the playback module 321. The database 320 is an area for information of play lists that are read from the disc and information of clips, namely clip information.

The playback module 321 is composed of a decoder engine 322 and a property 323 that is a value representing the stratus of the playback module 321. Like a language code, the property 323 is composed of two types of a property 323A (read-only parameter) whose value depends on the initial setting of the movie player 300 and a property 323B (player status) whose value depends on the status of the playback module 321.

The property 323A whose value depends on the initial setting is set by a native system, for example a real device. The property 323A does not vary with a play list, clip information, or a script program. The property 323A can be read from a script program. On the other hand, the property 323B that represents the status of the playback module 321 can be read from a script program. The property 323B can be written from a part of script programs.

In the operation model, it is assumed that a play list and clip information are pre-loaded before a clip AV stream is reproduced. Another implementation model may be used as long as the operations for the movie player model can be accomplished.

The movie player object 300 reproduces a designated play list corresponding to a command received from the script layer 302 or the native implementation platform 301. For example, the movie player 300 references the database 320 and obtains the reproduction position of a clip AV stream corresponding to the designated play list as a byte position. The decoder engine 322 of the playback module 321 controls the decoding process for the clip AV stream corresponding to the reproduction position information.

As shown in FIG. 32, the movie player 300 has three statuses, which are play, stop, and pause, corresponding to the reproduction statuses of a play list. The play status represents that the movie player 300 is reproducing a play list and a time is elapsing. In addition, normal reproduction, the play status includes variable speed reproductions such as 2×-speed reproduction and ½×-speed reproduction, and fast forward and fast rewind. The pause status represents that time axis stops while the movie player 300 is reproducing a play list. The so-called step reproduction status represents that the movie player 300 forwardly or backwardly reproduces a play list for each frame. The stop status represents that the video player 300 does not reproduce a play list.

The statuses of the movie player 300 change corresponding to status changes among play, pause, and stop of the decoder engine 322 of the movie player 300. The value of the property 323B is updated corresponding to the status change of the decoder engine 322.

Resume information represents the status immediately before the stop status takes place. When the movie player 300 decodes a play list and becomes the play status, if the movie player 300 becomes the stop status, the resume information represents the status immediately before the stop status takes place. The resume information can be stored in a non-volatile memory that the player has as hardware so that each title of the disc can be identified.

2-3. About Event Model of Movie Player

Next, an event model of the movie player 300 will be described. The movie player 300 generates various events in the play status in which the movie player 300 reproduces a play list. This event causes a process program described in a script to be executed. This process program is called an event handler. The event handler is a method called when an event takes place. When this event takes place, a program execution model starts executing a process program. This program execution model is called an event driven model. According to the second embodiment of the present invention, the script program controls the operation of the movie player object 300 with an event handler group.

Figure 33:
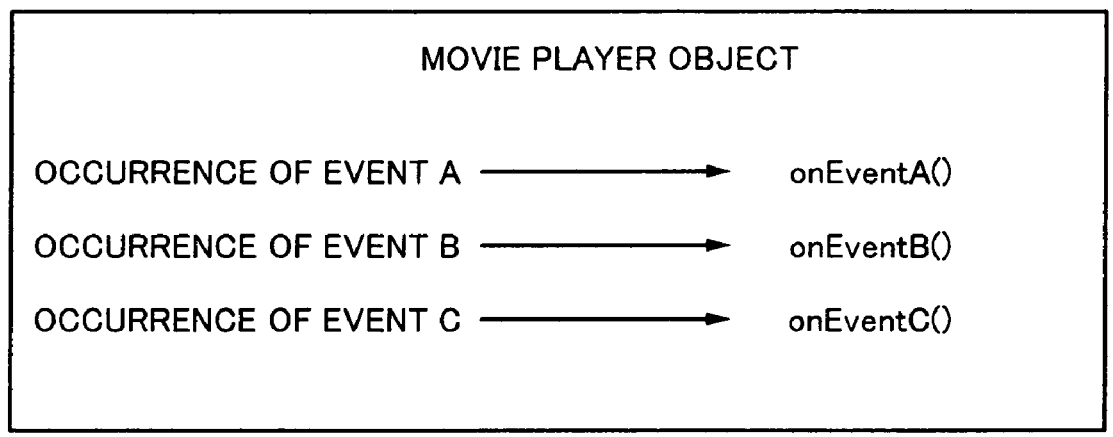
FIG. 33 is a schematic diagram showing an event model of the movie player according to the second embodiment of the present invention.

FIG. 33 schematically shows an event model of the movie player 300 according to the second embodiment of the present invention. In FIG. 33, event handlers onEventA( ), onEventB( ), and onEvent( ) are interfaces. The contents of these event handlers are described in script. The contents of the event handlers are created and implemented by the content creator side. In the UMD video script standard, each event of which the movie player object 300 informs the script program is provided with an event handler. In the example shown in FIG. 33, a process program that is executed when event A takes place is event handler onEventA( ). Likewise, with respect to event B and event C, when event B takes place, event handler onEventB( ) is executed. When event C takes place, event handler onEventC( ) is executed.

Since an event handler called when an event takes place is selected on the system side, the content creator side does not need to describe in the script program a process that determines an event that takes place.

The event model according to the second embodiment is simpler than the event listener model according to the first embodiment described in FIG. 15 because the latter needs processes that register events and delete registered events. On the other hand, in a model that calls one method processEvent( ) regardless of what event takes place (see FIG. 20), it is necessary to describe in method processEvent( ) pre-processes that know what event takes place and select a process routine for an event that takes place. Since method processEvent( ) should be implemented by the content creator side, even if the model is simple, the content creator side needs to laboriously create the disc. In addition, whenever an event takes place, one large process program (method) is called. Thus, a large memory space would be used and the execution speed would become slow. Thus, since the model according to the second embodiment of the present invention provides each event with a process program (event handler), with respect to this point, the model of the second embodiment is superior to that of the first embodiment.

2-4. About Movie Player Object 300

Next, external specifications of the movie player object 300 will be described. Generally, an object defined in a language corresponding to the ECMA script language specification has a property and a method. The movie player object 300 according to the second embodiment of the present invention has a property and a method as described in FIG. 31 and FIG. 32. A property can be directly read and written by designating predetermined object name and property name. In addition, with method setXXX( ) (where "XXX" represents a designated property name) that sets a property value and method getXXX( ) that reads a property value, a property of another object may be read and written by these methods.

For properties and methods of the movie player 300 according to the second embodiment of the present invention, the same specifications as those according to the first embodiment described in FIG. 7 to FIG. 12 can be applied. In other words, according to the second embodiment of the present invention, specifications (API) between the script program of the script layer 302 and the movie player object 300, namely the method 313 described in FIG. 30, can be thought to be the same class defined in Java of the first embodiment of the present invention.

As was described in FIG. 30, the user input 310 is received first by the native implementation platform 301. In other words, the native implementation platform 301 receives the key input as the user input 310 from the user. The native implementation platform 301 determines whether the user input 310 is a command to the movie player 300 or an event to the script program of the script layer 302. Corresponding to the determined result, the native implementation platform 301 generates the control command 311 or the key event 314 and informs the corresponding upper layer (the movie player 300 or the script layer 302) thereof.

The user input 310 is a key input that was described in FIG. 24, FIG. 25A, and FIG. 25B. Roles of the functions corresponding to key inputs shown in FIG. 24 are different from those shown in FIG. 25A and FIG. 25B. Thus, the native implementation platform 301 needs to select a destination that is informed of the user input.

The key inputs shown in FIG. 24 cause the movie player 300 to reproduce video data, audio data, and sub title data. When the native implementation platform 301 receives a key input shown in FIG. 24 as the user input 310, the native implementation platform 301 converts the received key input into a command described in FIG. 21A, FIG. 21B, FIG. 21C, and FIG. 21D. The movie player 300 is informed of the converted command as the control command 311. In other words, user input commands described in FIG. 21A, FIG. 21B, FIG. 21C, and FIG. 21D correspond to the control command 311 shown in FIG. 30.

On the other hand, the key inputs shown in FIG. 25A and FIG. 25B are the user input 310 to the GUI. When the native implementation platform 301 receives a key input shown in FIG. 25A and FIG. 25B as the user input 310, the native implementation platform 301 converts the received key input into the key event 314 and informs the script layer 302 of the key event 314.

FIG. 25A and FIG. 25B also show key inputs with respect to stream selections that are key VK_ANGLE, key VK_PRESENTATION_GRAPHICS, and key VK_AUDIO. These key inputs are accomplished by methods of a script program to the movie player 300. Thus, they are key inputs of which the script layer 302 should be informed.

2-5. About Event Handling by Movie Player Object 300

According to the first embodiment using the Java language, object BDBasicPlayer has the events shown in FIG. 14A, FIG. 14B, and FIG. 14C. On the basis of the event listener model shown in FIG. 15, listeners are registered and unregistered with the methods shown in FIG. 16A and FIG. 16B. In the event listener model according to the first embodiment, while a program is being executed, a listener can be dynamically registered and unregistered. A response process to an event can be changed while a program is being executed. Thus, programming that has a higher degree of freedom and a higher advanced function can be accomplished than the related art.

On the other hand, in the script language based on the ECMA script according to the second embodiment of the present invention, a process program that has been prepared corresponding to an event that takes place is called without need to register and unregister listeners. An interface corresponding to a listener according to the first embodiment is event handlers of the movie player 300. In an event handler model, methods with respect to registration of listeners shown in FIG. 16A and FIG. 16B are not necessary.

According to the second embodiment of the present invention, examples of event handlers in FIG. 34A and FIG. 34B are provided corresponding to events. Event handler names have a prefix of "on." The examples of the event handles shown in FIG. 34A and FIG. 34B correspond to events shown in FIG. 14A, FIG. 14B, and FIG. 14C of the first embodiment.

Event handler onTimerFired( ) corresponds to an event that takes place when the value of the count down timer of the movie player 300 becomes "0" or when the value of the count up timer becomes a predetermined value. Thus, a process can be accomplished at predetermined timing.

Event handler onPlayStopped( ) corresponds to an event that takes place when the reproduction is stopped in the movie player 300. Event handler onPlayStilled( ) corresponds to an event that takes place when the reproduction is paused in the movie player 300. Event handler onPlayStarted( ) corresponds to an even that takes place when the reproduction is started in the movie player 300. Event handler onPlayRepeated( ) corresponds to an event that takes place when the beginning of predetermined data is detected in the repeat reproduction of the movie player 300. Thus, a process corresponding to the status of the decoder engine 322 can be accomplished.

Event handler onSPDisplayStatusChanged( ) corresponds to an event that takes place when the display or non-display status of a stream of sub title (sub picture) data is changed in the movie player 300. Event handler onSelectedAudioChanged( ) corresponds to an event that takes place when an audio stream that is being reproduced is changed in the movie player 300. Event handler onVideoStopped( ) corresponds to an event that takes place when a video stream that is being reproduced is changed in the movie player 300. Thus, a process corresponding to a change of a stream that is being reproduced can be accomplished.

Event handler onPlayListStarted( ) corresponds to an event that takes place when the beginning of a play list is detected in the movie player 300. Event handler onPlayListEnded corresponds to an event that takes place when the end of a play list is detected in the movie player 300. Event handler onPlayItemStarted( ) corresponds to an event that takes place when the beginning of a play item is detected in the movie player 300. Event handler onPlayItemEnded corresponds to an event that takes place when the end of a play item is detected in the movie player 300. Thus, processes corresponding to the start and end of the reproduction for play lists and play items, such as a continuous reproduction for play lists and play items, can be accomplished.

Event handler onMarkEncountered( ) corresponds to an event that takes place when a mark is detected from a play list while the play list is being reproduced in the movie player 300. When a mark that represents a time is preset to a play list, a branch process for a play list that is being reproduced can be accomplished.

Contents of these event handlers are described using a descriptive language by the content creator side. Thus, when an event takes place, an operation that the content provider side intended can be accomplished.

DESCRIPTION OF REFERENCE NUMERALS

30 BD BASIC PLAYER
31 Java PROGRAM
32 API
34 COMMON PARAMETER
35 PLAYER COMMAND
104 CODE BUFFER
106 MULTIMEDIA ENGINE
200 BD PRESENTATION ENGINE
201 NAVIGATION ENGINE
202 Java VM
203 Java APPLICATION
210 OBJECT BDBasicPlayer,
211 LISTENER INTERFACE
300 MOVIE PLAYER
301 NATIVE IMPLEMENTATION PLATFORM
302 SCRIPT LAYER
310 USER INPUT
311 CONTROL COMMAND
312, 314 EVENT
313, 315 METHOD
320 DATABASE
321 PLAYBACK MODULE
322, DECODER ENGINE
323 PROPERTY
S20 DECIDE AT WHAT SCENE OF PLAY LIST BUTTON APPEARS.
S21 SET MARK AT DESIGNATED TIME.
S22 DESCRIBE METHOD THAT REGISTERS EVENT LISTENER CORRESPONDING TO MARK TO BUTTON OBJECT IN PROGRAM.
S23 IMPLEMENT LISTENER INTERFACE CORRESPONDING TO MARK GENERATION EVENT (DESCRIBE PROCESS EXECUTED WHEN EVENT TAKES PLACE).
S30 START REPRODUCTION OF PLAY LIST.
S31 BDBasicPlayer. DETECTS THAT. MARKED TIME ELAPSED WHILE PLAY LIST WAS BEEN REPRODUCED.
S32 HAS EVENT LISTENER CORRESPONDING TO MARK EVENT BEEN REGISTERED ?.
S33 TRANSMIT MARK EVENT TO OBJECT THAT HAS REGISTERED EVENT LISTENER.
S34 OBJECT INFORMED OF EVENT EXECUTES METHOD TO BE EXECUTED WHEN MARK EVENT TAKES PLACE.
S35 CAUSE BUTTON TO APPEAR.
S36 NOT INFORMED OF MARK DETECTION. EVENT.
S41 USER PRESSED "NEXT" KEY DURING. REPRODUCTION.
S42 RmtKeyEvent TAKES PLACE.
S43 OBTAIN POSITION OF NEXT CHAPTER MARK FROM DATABASE.
S44 IS THERE CHAPTER MARK ?
S45 STOP REPRODUCTION.
S46 PlayStoppedEvent TAKES PLACE.

S47 ACCESS TYPE POSITION OF NEXT CHAPTER MARK AND START REPRODUCTION OF VIDEO DATA.
S48 PlayStartedEvent AND MarkEncounteredEvent TAKE PLACE.
S49 START EXECUTION OF LISTENER CORRESPONDING TO MarkEncounteredEvent.
S50 OBTAIN TYPE OF Mark.
S51 CHAPTER MARK ?
S52 DISPLAY MESSAGE REPRESENTING BEGINNING OF CHAPTER.
S53 COMPLETE EXECUTION OF LISTENER.

The invention claimed is:

1. A reproducing apparatus that reproduces content data hierarchically recorded on a disc-shaped recording medium, comprising:
    a player object that generates an event corresponding to a predetermined change; and
    a program object that is formed above said player object, that is capable of describing a process corresponding to the event that takes place, that is formed as an independent object per each event, and that is stored in a data file independent of a data file storing the contents data as a clip AV stream file,
    wherein said player object controls a reproduction process for content data hierarchically recorded on the disc-shaped recording medium with a process corresponding to the event described in said program object.

2. The reproducing apparatus as set forth in claim 1, wherein said program object is reproduced from the recording medium.

3. The reproducing apparatus as set forth in claim 1, wherein when said program object registers a process corresponding to the event that takes place to said player object, said player object executes the process corresponding to the event that takes place.

4. The reproducing apparatus as set forth in claim 3, wherein while the content data are being reproduced, the process is capable of being registered.

5. The reproducing apparatus as set forth in claim 3, wherein while the content data is being reproduced, the process that has been registered is capable of being deregistered.

6. The reproducing apparatus as set forth in claim 1, wherein the predetermined change is a change that takes place while the content data is being reproduced.

7. The reproducing apparatus as set forth in claim 6, wherein the predetermined change is detection of a mark that represents a time that is set in the content data.

8. The reproducing apparatus as set forth in claim 1, further comprising:
    user input means for receiving a user input and informing said player object of the user input,
    wherein the predetermined change is based on an input to said user input means.

9. The reproducing apparatus as set forth in claim 8, wherein a virtual key is allocated to a physical key of said user input means by said program object, the predetermined change being an input to the virtual key.

10. The reproducing apparatus as set forth in claim 1, wherein the predetermined change is a status change of a player.

11. The reproducing apparatus as set forth in claim 1, wherein one or a plurality of events take place corresponding to the change based on the event.

12. The reproducing apparatus as set forth in claim 1, wherein the reproduction process includes a reproduction control that reproduces the content data from the disc-shaped recording medium and a process for the content data reproduced from the disc-shaped recording medium.

13. A reproducing method of reproducing content data hierarchically recorded on a disc-shaped recording medium, comprising:
    causing a player object that generates an event corresponding to a predetermined change to control a reproduction process for content data hierarchically recorded on the disc-shaped recording medium with a process corresponding to the event described in a program object that is formed above the player object, that is capable of describing a process corresponding to the event that takes place, that is formed as an independent object per each event, and that is stored in a data file independent of a data file storing the contents data as a clip AV stream file.

14. A computer readable non-transitory recording medium on which a reproducing program has been recorded, the reproducing program causing a computer device to execute a reproducing method of reproducing content data hierarchically recorded on a disc-shaped recording medium, comprising: causing a player object that generates an event corresponding to a predetermined change to control a reproduction process for content data hierarchically recorded on the disc-shaped recording medium with a process corresponding to the event described in a program object that is formed above the player object, that is capable of describing a process corresponding to the event that takes place, that is formed as an independent object per each event, and that is stored in a data file independent of a data file storing the contents data as a clip AV stream file.

15. A disc-shaped recording medium on which content data have been hierarchically recorded,
    at least content data and a program object that is capable of describing a process corresponding to an event that takes place being recorded on the recording medium, the program object being formed as an independent object per each event, and that is stored in a data file independent of a data file storing the contents data as a clip AV stream file,
    a reproduction process for the content data being controlled with a process corresponding to the event described in the program object by a player object that generates an event corresponding to a predetermined change and formed below the program object.

16. The recording medium as set forth in claim 15, wherein when the program object registers a process corresponding to the event that takes place to the player object, the player object executes the process corresponding to the event that takes place.

17. The recording medium as set forth in claim 16, wherein while the content data are being reproduced, the program object is capable of registering the process.

18. The recording medium as set forth in claim 16, wherein while the content data is being reproduced, the program object is capable of deregistering the process that has been registered.

19. The recording medium as set forth in claim 15, wherein the predetermined change is a change that takes place while the content data is being reproduced.

20. The recording medium as set forth in claim 19, wherein the predetermined change is based on a mark that represents a time that is set in the content data.

21. The recording medium as set forth in claim 15, wherein the predetermined change is based on an input to user input means.

22. The recording medium as set forth in claim 21, wherein the program object assigns to a physical key of the user input means a virtual key that causes a predetermined change to take place corresponding to an input.

23. The recording medium as set forth in claim 15, wherein the predetermined change is a status change of a player.

24. The recording medium as set forth in claim 15, wherein one or a plurality of events take place corresponding to the change based on the event.

25. The recording medium as set forth in claim 15, wherein the reproduction process includes a reproduction control that reproduces the content data and a process for the content data that have been reproduced.

* * * * *